US012625811B2

(12) United States Patent
Dong et al.

(10) Patent No.: US 12,625,811 B2
(45) Date of Patent: May 12, 2026

(54) MULTI-TIER MEMORY RECLAMATION

(71) Applicant: Microsoft Technology Licensing, LLC, Redmond, WA (US)

(72) Inventors: Junfeng Dong, Sammamish, WA (US); Ajay Kalhan, Redmond, WA (US); Michael E. Habben, Sammamish, WA (US); John M. Oslake, Seattle, WA (US); Preetham Melavarige Gopalakrishna, Bengaluru (IN); Dhrumilkumar Utpalbhai Shah, Bengaluru (IN); Purvi Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 124 days.

(21) Appl. No.: 18/324,750

(22) Filed: May 26, 2023

(65) Prior Publication Data

US 2024/0394187 A1      Nov. 28, 2024

(51) Int. Cl.
G06F 12/0871      (2016.01)
G06F 11/30      (2006.01)
G06F 12/0813      (2016.01)
G06F 12/128      (2016.01)

(52) U.S. Cl.
CPC ...... *G06F 12/0813* (2013.01); *G06F 11/3037* (2013.01); *G06F 12/0871* (2013.01); *G06F 12/128* (2013.01)

(58) Field of Classification Search
CPC ............. G06F 12/0813; G06F 11/3037; G06F 12/128; G06F 12/0871
See application file for complete search history.

(56) References Cited

U.S. PATENT DOCUMENTS 11,595,319 B2 *   2/2023   Li ......................... G06F 9/5022
2018/0260330 A1   9/2018   Felter
2020/0349067 A1   11/2020   Syamala et al.
2020/0379896 A1 *   12/2020   Syamala ............... G06F 16/284
(Continued)

OTHER PUBLICATIONS

A screen shot taken Sep. 30, 2023 of a definition of sample that indicates it may be a representativ part from a whole. (Year: 2023).*
(Continued)

*Primary Examiner* — Janice M. Girouard
(74) *Attorney, Agent, or Firm* — Weaver IP L.L.C.

(57) ABSTRACT

Reclamation of a portion of a cache memory in a cloud computing environment is described herein. A cache activeness signal is received from a cache broker. The cache activeness signal is representative of a usage of a first set of cache entries of the cache memory by a first group of computing nodes in a cluster of nodes. A determination to reclaim a portion of the first set of cache entries or of a second set of cache entries is made based at least on the cache activeness signal. The second set of cache entries are utilized by a second group of computing nodes in the cluster of nodes. The determined portion of memory is reclaimed. In an aspect, the cache broker determines a usage of the set of cache entries by the first group of computing nodes and generates the cache activeness signal representative of the determined usage.

20 Claims, 6 Drawing Sheets

300

Determine a usage of a first set of cache entries by a first group of computing nodes ⌐302

Generate a first cache activeness signal representative of the determined usage of the first set of cache entries ⌐304

Receive the first cache activeness signal ⌐306

Determine to reclaim a portion of the first set of cache entries or of a second set of cache entries based at least on the first cache activeness signal ⌐308

Reclaim the determined portion of the cache memory ⌐310

(56)          References Cited

U.S. PATENT DOCUMENTS

2022/0075731 A1 *   3/2022   Dong ................... G06F 9/5022
2022/0164228 A1     5/2022   Volobuev
2022/0200927 A1     6/2022   Li et al.

OTHER PUBLICATIONS

Ab article titled "A Hybrid Cache Architecture for Meeting Per-Tenant Performance Goals in a Private Cloud" (Year: 2019).*
International Search Report and Written Opinion received for PCT Application No. PCT/US2024/030150, Sep. 23, 2024, 14 pages.

* cited by examiner

200

300

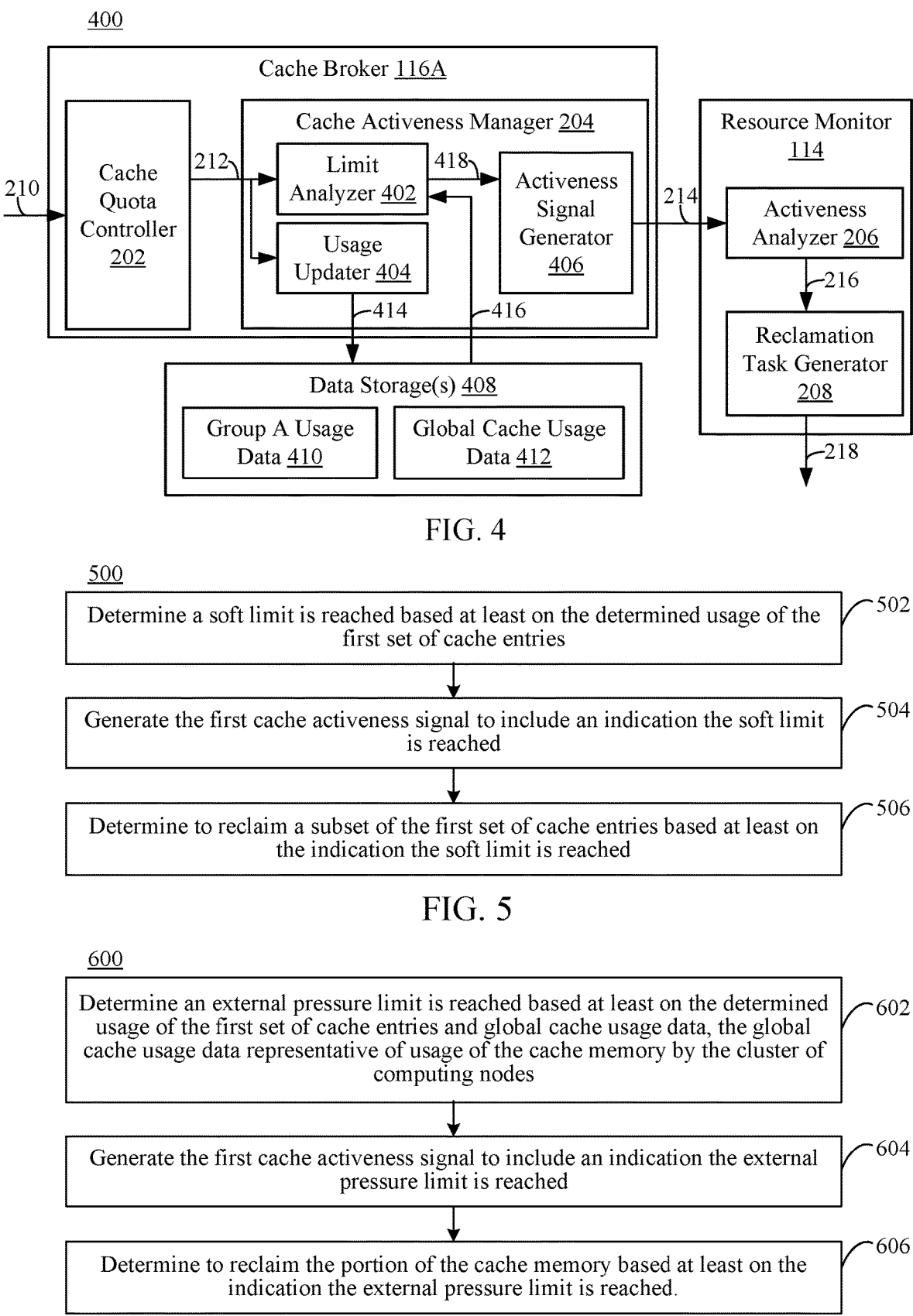

| Determine a soft limit is reached based at least on the determined usage of the first set of cache entries | 502 |

| Generate the first cache activeness signal to include an indication the soft limit is reached | 504 |

| Determine to reclaim a subset of the first set of cache entries based at least on the indication the soft limit is reached | 506 |

| Determine an external pressure limit is reached based at least on the determined usage of the first set of cache entries and global cache usage data, the global cache usage data representative of usage of the cache memory by the cluster of computing nodes | 602 |

| Generate the first cache activeness signal to include an indication the external pressure limit is reached | 604 |

| Determine to reclaim the portion of the cache memory based at least on the indication the external pressure limit is reached. | 606 |

1000
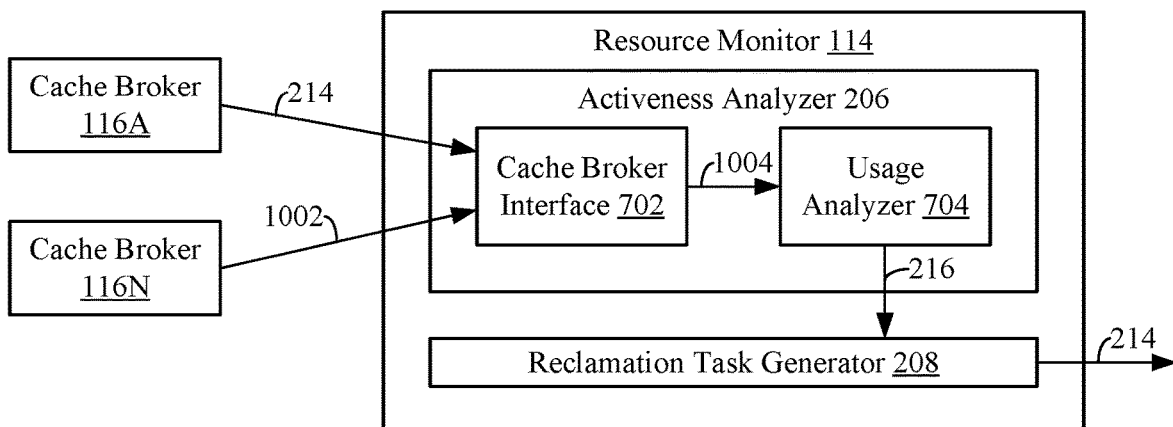
FIG. 10
1100
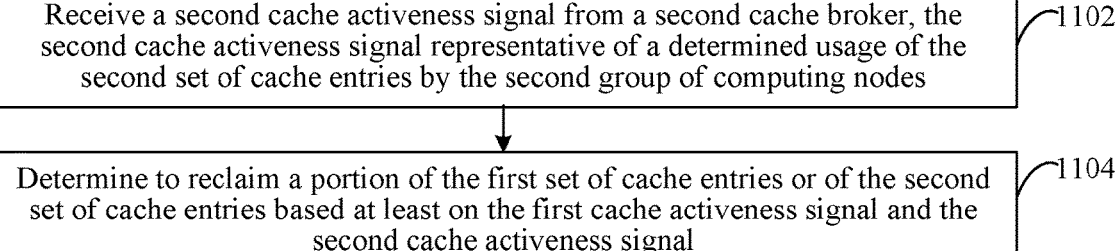
FIG. 11
1200
| Determine a total of the second set of cache entries used by the second group of computing nodes has a predetermined relationship with a threshold | 1202 |
|---|---|
| Reclaim a cache entry of the second set of cache entries | 1204 |
FIG. 12

MULTI-TIER MEMORY RECLAMATION

BACKGROUND

Cloud computing refers to the access and/or delivery of computing services and resources, including servers, storage, databases, networking, software, analytics, and intelligence, over the Internet ("the cloud"). A cloud computing platform may make such services and resources available to user entities, referred to as "tenants," for fees. A cloud computing platform typically supports multiple tenants, with each tenant accessing a respective portion of the services and resources simultaneously with other tenants accessing other portions of the services and resources. Such a cloud computing platform is considered "multitenant."

Databases in cloud computing environments can be grouped together in elastic pools that use a shared resource pool. Resource monitoring systems (also referred to as "resource monitors") monitor and evaluate the use of database resources, such as cache memory (relatively fast storage), secondary storage, compute nodes, etc. If the utilization of a shared cache memory resource is below a threshold, or the database is idle, a process wide memory reclamation task may be used to reclaim a portion of the cache memory. In some databases, different tenants may use the same memory resources. Furthermore, each tenant may have a different level of activity and utilization from other tenants.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are described herein for reclaiming a portion of a cache memory in a cloud computing environment. In an aspect of the present disclosure, a first cache activeness signal is received from a first cache broker. The first cache activeness signal is representative of a usage of a first set of cache entries of the cache memory by a first group of computing nodes in a cluster of computing nodes. A second set of cache entries is utilized by a second group of computing nodes in the cluster of computing nodes. A determination to reclaim a portion of the first set of cache entries or of the second set of cache entries is made based at least on the first cache activeness signal. The determined portion of the cache memory is reclaimed.

In a further aspect of the present disclosure, a first cache broker determines a usage of the first set of cache entries by the first group of computing nodes and generates a first cache activeness signal representative of the determined usage of the first set of cache entries.

In a further aspect of the present disclosure, a resource monitor receives a second cache activeness signal from a second cache broker. The second cache activeness signal is representative of a determined usage of the second set of cache entries by the second group of computing nodes. A determination to reclaim a portion of the first set of cache entries or of the second set of cache entries is made based at least on the first and second cache activeness signals.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 4 shows a block diagram of a system for managing cache activeness, in accordance with an embodiment.

FIG. 5 shows a flowchart of a process for reclaiming a subset of cache entries based on an indication that a soft limit is reached, in accordance with an embodiment.

FIG. 6 shows a flowchart of a process for reclaiming a portion of cache memory based on an indication that an external pressure limit is reached, in accordance with an embodiment.

FIG. 10 shows a block diagram of a system for reclaiming a portion of cache memory based on multiple cache activeness signals, in accordance with an example embodiment.

FIG. 11 shows a process for reclaiming a portion of cache memory based on multiple cache activeness signals, in accordance with an example embodiment.

FIG. 12 shows a process for reclaiming a cache entry from a second set of cache entries, in accordance with an example embodiment.

Figure 1:
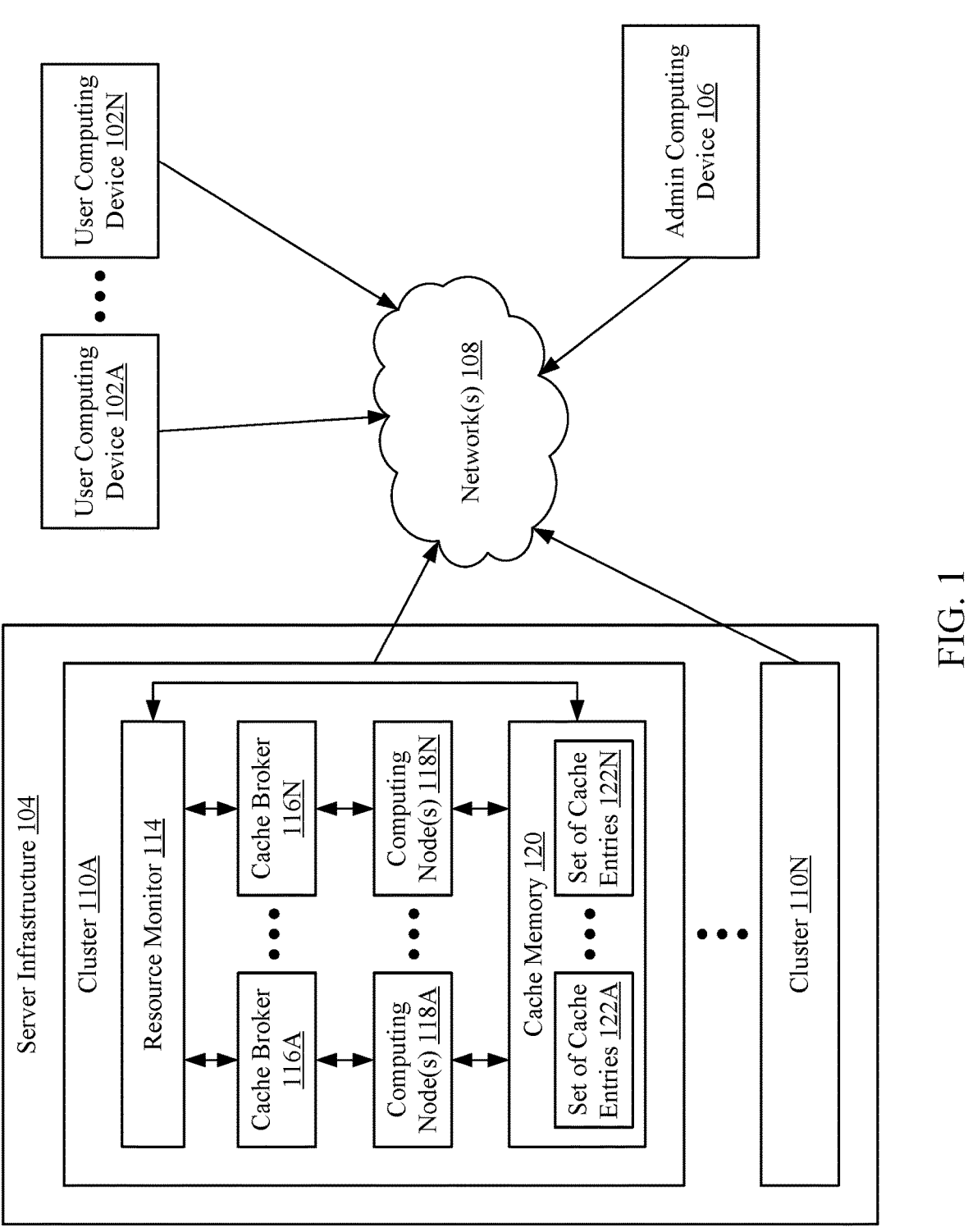
FIG. 1 shows a block diagram of a system for performing multi-tier memory reclamation, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Serverless elastic pools are a mechanism for grouping large scale databases (e.g., SQL (structured query language) databases) together into a shared resource pool and minimizing complexity in cost/performance management. Resource monitoring systems (also referred to as "resource monitors" herein) monitor and evaluate the use of database resources. Whenever a database has been idle for a period or active cache utilization is below a threshold, the resource monitoring system reclaims cache memory for the database.

In an aspect of memory reclamation, process wide memory reclamation enables processes to automatically scale cache memory. In this context, a resource monitoring system determines cache memory should be reclaimed and reclaims a portion of the cache memory across the cache memory for a process. However, in some databases, such as a multi-tenant process, different tenants (e.g., individual user tenants, groups of user tenants, organization tenants, etc.) use the same memory resources across a process. Each tenant may have a different level of activity in the process. In this context, a process wide memory reclamation uses a set of thresholds (e.g., overall cache memory utilization), to determine if cache memory should be reclaimed. However, a particular tenant in the multi-tenant process may have low activeness, which might skew the overall cache memory usage toward appearing less used, and thus make cache memory reclamation more likely for the group of tenants.

Embodiments of the present disclosure implement multi-tier memory reclamation for databases using a cache broker that tracks the usage of cache memory by a corresponding tenant. For example, a cluster of computing nodes in a cloud computing environment comprises a first group of computing nodes and a second group of computing nodes. A cache memory comprises a first set of cache entries utilized by the first group of computing nodes and a second set of cache entries utilized by the second group of computing nodes. In one aspect of the present disclosure, a cache broker determines a usage of the first set of cache entries by the first group of computing nodes and generates a first cache activeness signal representative of the determined usage of the first set of cache entries. A resource monitor in the cloud computing environment receives the first cache activeness signal and determines to reclaim a portion of the first set of cache entries or of the second set of cache entries based at least on the first cache activeness signal and reclaims the determined portion of the cache memory.

The techniques described herein provide fine grained and multi-tiered memory reclamation for multitenant processes. In addition to (and/or in lieu of) process wide memory reclamation, embodiments described herein implement a reclamation system that efficiently reclaims cache memory for individual tenants depending on the utilization of the cache memory of the tenant and/or the utilization of the cache memory with respect to other tenants in the multi-tenant process. For instance, in an aspect of the present disclosure, if a tenant has been idle for a pre-determined period of time, or the tenant's active cache utilization is below a threshold, the reclamation system reclaims a portion of cache entries utilized by the tenant (e.g., without reclaiming cache entries utilized by other tenants) so that overall cache memory utilization is improved. By identifying which tenants (or users) have an idle cache, embodiments are able to selectively determine which portions of the cache memory should be reclaimed, which reduces negative impact on other tenants (or users) utilizing resources of the shared resource pool.

In another aspect, techniques described herein determine if a tenant is exceeding a cache usage limit (e.g., the tenant is a "bully" tenant). In this aspect, embodiments described herein are able to selectively apply soft limits or hard limits to the tenant's utilization of the cache memory and selectively reclaim portions of the cache memory utilized by the bully tenant, which reduces memory pressure on other users using resources of the shared resource pool.

To help illustrate the aforementioned systems and methods, FIG. 1 will now be described. FIG. 1 shows a block diagram of a system 100 for performing multi-tier memory reclamation, in accordance with an example embodiment. As shown in FIG. 1, system 100 includes user computing device 102A through user computing device 102N (collectively referred to as "user computing devices 102A-102N"), server infrastructure 104, and admin computing device 106. Each of user computing devices 102A-102N, server infrastructure 104, and admin computing device 106 are communicatively coupled to each other via network 108. Network 108 may comprise one or more networks such as local area networks (LANs), wide area networks (WANs), enterprise networks, the Internet, etc., and may include one or more wired and/or wireless portions.

Server infrastructure 104 may be a network-accessible server set (e.g., a cloud-based environment or platform). As shown in FIG. 1, server infrastructure 104 includes a cluster 110A and cluster 110N (collectively referred to as "clusters 110A-110N"). Each cluster of clusters 110A-110N may comprise a resource monitor, one or more cache brokers, one or more groups of one or more nodes (also referred to as computing nodes or compute nodes), and a cache memory. For example, as shown in FIG. 1, cluster 110A includes a resource monitor 114, a cache broker 116A and a cache broker 116N (collectively referred to as "cache brokers 116A-116N"), a group of computing nodes 118A (also referred to as "resource group 118A" or "user database 118A") and a group of computing nodes 118N (also referred to as "resource group 118N" or "user database 118N") (collectively referred to as "resource groups 118A-118N"), and a cache memory 120. Cluster 110N (and other clusters of clusters 110A-110N not shown in FIG. 1) may include similar resource monitors, cache brokers, computing nodes, and/or cache memories to those shown in cluster 110A. In embodiments, server infrastructure 104 may include fewer or greater numbers of clusters than depicted in FIG. 1.

As shown in FIG. 1, resource monitor 114 and cache brokers 116A-116N are implemented as separate services. In accordance with an alternative embodiment, resource monitor 114 and cache brokers 116A-116N are implemented as a single service, (e.g., a "reclamation service"). In accordance with an embodiment, and as described elsewhere herein, each cache broker of cache brokers 116A-116N is associated with a corresponding group of resource groups 118A-118N. In accordance with an embodiment, each cache broker of cache brokers 116A-116N is initialized when the corresponding group of resource groups 118A-118N is initialized (e.g., cache broker 116A is initialized when resource group 118A is initialized) and deactivated when the corresponding group is deactivated. In embodiments, cluster 110A may include fewer or greater numbers of resource monitors, cache brokers, and/or groups of nodes than depicted in FIG. 1.

Each computing node of resource groups 118A-118N are accessible via network 108 (e.g., in a "cloud-based" environment) to build, deploy, and manage applications and services. Any node of resource groups 118A-118N may be a storage node that comprises a plurality of physical storage disk that are accessible via network 108 and is configured to store data associated with the applications and services managed by nodes of resource groups 118A-118N.

In an embodiment, one or more of clusters 110A-110N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 110A-110N may be a datacenter in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Each node of resource groups 118A-118N may comprise one or more server computers, server systems, and/or computing devices. Each node of resource groups 118A-118N may be configured to execute one or more software applications (or "applications") and/or services and/or manage hardware resources (e.g., processors, memory, etc.), which may be utilized by users (e.g., customers) of the network-accessible server set. Node(s) may also be configured for specific uses. For example, any of node of resource groups 118A-118N may be configured to execute resource monitor 114, configured to execute a cache broker of cache brokers 116A-116N, and/or store cache entries of cache memory 120. It is noted that resource monitor 114 and/or cache brokers 116A-116N may be incorporated as services on a computing device external to cluster 110A and/or server infrastructure 104.

Cache memory 120 comprises cache memory utilized by computing nodes of cluster 110A (e.g., nodes of resource groups 118A-118N). "Cache memory" refers to a data storage component that stores data to enable future requests for the data to be served faster. As shown in FIG. 1, cache memory 120 includes a set of cache entries 122A and a set of cache entries 122N (collectively referred to as "sets of cache entries 122A-122N"). Each set of sets of cache entries 122A-122N comprises one or more cache entries utilized by a node of resource groups 118A-118N. In accordance with an embodiment, cache memory 120 includes cache entries that are not currently used by a node of resource groups 118A-118N but are available for use by a node (e.g., "available nodes" or "unused nodes"). Cache entries of sets of cache entries 122A-122N may include any type of cache memory, including, but not limited to, external cache memory (e.g., buffer pools, column stores, etc.) and/or internal cache memory (e.g., cache stores, user stores, object stores, etc.). In accordance with an embodiment, resource monitor 114 prioritizes memory reclamation based on the type of cache memory (e.g., reclaiming external caches before internal caches, reclaiming internal caches if a global internal cache limit is reached, etc.). Cache memory 120 may include fewer or greater numbers of sets of cache entries than depicted in FIG. 1. In accordance with an embodiment, and as described elsewhere herein, each set of sets of cache entries 122A-122N comprises cache entries utilized by a corresponding group of resource groups 118A-118N (e.g., set of cache entries 122A comprises cache entries utilized by resource group 118A and set of cache entries 122N comprises cache entries utilized by resource group 118N).

User computing devices 102A-102N include any computing systems (e.g., one or more computing devices, enterprise computing systems, networked computing systems, etc.) of users (e.g., individual users, groups of users, subscriptions of users, tenants, etc.) and admin computing device 106 includes any computing device of an admin user (e.g., a cloud provider service team user, a cloud provider developer user, a cloud provider account management user, etc.) of the cloud provider. Computing devices of user computing devices 102A-102N and/or admin computing device 106 may access network accessible-resources of server infrastructure 104 over network 108. System 100 may include fewer or greater numbers of admin computing devices and/or user computing devices than depicted in FIG. 1. Computing devices of user computing devices 102A-102N, and/or admin computing device 106 may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of user computing devices 102A-102N and admin computing device 106 store data and execute computer programs, applications, and/or services.

For example, each of user computing devices 102A-102N may include various services (not shown in FIG. 1) that enable utilization of and/or interaction with nodes of resource groups 118A-118N. Admin computing device 106 may include various services (not shown in FIG. 1) that enable the management of server infrastructure 104, the authorization of users, the review of memory reclamation by resource monitor 114 and/or cache brokers 116A-116N, and/or other operations associated with the administration of the cloud computing environment of system 100.

Depending on the implementation, the computing nodes in a particular group of resource groups 118A-118N correspond to nodes utilized by and/or interacted with by at least one of the same user, the same group of users, the same subscription, and/or the same tenant. As a non-limiting example, resource group 118A comprises nodes utilized by and interacted with by a user of user computing device 102A ("User A") and resource group 118N comprises nodes utilized by and interacted with by a user of user computing device 102N ("User N").

Users are enabled to interact with and utilize nodes via interaction with corresponding computing devices. In embodiments, a user's interaction with and/or use of a group of nodes includes use of a corresponding set of cache entries in a cache memory of a cluster. For instance, each node of resource groups 118A-118N is assigned a resource group identifier (ID) that uniquely identifies the group the node is part of (e.g., nodes of resource group 118A are assigned a resource group ID of "Group A" and nodes of resource group 118N are assigned a resource group ID of "Group N"). When a cache entry is initialized for use by a node, the cache entry is assigned the resource group ID of that node. In accordance with an embodiment, the resource group ID is included in the task used to create (or initialize) the cache entry. As a non-limiting example, suppose User A interacts with nodes of Group A. In this context, cache entries of cache memory 120 are initialized for use by nodes of Group A by assigning set of cache entries 122A the Group A resource group ID. Cache broker 116A monitors the use of set of cache entries 122A by nodes of Group A and generates a cache activeness signal representing the utilization of set of cache entries 122A by nodes of Group A.

Furthermore, suppose User N interacts with nodes of Group N. In this context, cache entries of cache memory 120 are initialized for use by nodes of Group N by assigning set of cache entries 122N the Group N resource group ID. Cache broker 116N monitors the use of set of cache entries 122N by nodes of Group N and generates a cache activeness signal representing the utilization of set of cache entries 122N by nodes of Group N.

Resource monitor 114 receives cache activeness signals from cache brokers 116A-116N and determines whether to reclaim cache entries of sets of cache entries 122A-122N based at least on one or more of the cache activeness signals. In this manner, resource monitor 114 selectively reclaims cache entries of cache memory 120 based on utilization by a particular group of resource groups 118A-118N (e.g., without reclaiming entries used by another group of resource groups 118A-118N), thereby increasing the efficiency by which cache entries of cache memory 120 are utilized by nodes. For instance, as a non-limiting example, if User A is idle for a predetermined amount of time, cache broker 116A (or resource monitor 114 in response to the cache activeness signal generated by cache broker 116A) determines that the activeness of User A is below a threshold, and resource monitor 114 selectively reclaims cache entries of set of cache entries 122A without reclaiming cache entries of set of cache entries 122N.

Thus, embodiments of resource monitor and cache brokers 116A-116N enable the selective reclamation of cache entries of cache memory 120, thereby improving the efficiency in which cache memory 120 is utilized by resource groups 118A-118N. Since reclaiming cache memory is targeted to cache entries associated with a particular resource group (e.g., by a resource group ID), the number of cache entries resource monitor 114 (or a cache broker of cache brokers 116A-116N) has to access is reduced. In a further aspect, resource monitor 114 and cache brokers 116A-116N may be configured to reclaim cache entries more frequently since less compute resources are required to perform reclamation. Additional details regarding determining a portion of cache entries to reclaim and the reclamation of the determined portion are described with respect to FIGS. 2-12, as well as elsewhere herein.

Moreover, embodiments of the present disclosure enable flexible reclamation policies for tenants across multi-tenant processes. In other words, each cache broker of cache brokers 116A-116N may be configured to generate respective cache activeness signals based on respective reclamation policies of the respective resource groups 118A-118N. For instance, cache broker 116A generates a cache activeness signal in accordance with a first reclamation policy of resource group 118A and cache broker 118N generates a cache activeness signal in accordance with a second reclamation policy of resource group 118N. This enables different tenants of a multitenant cloud computing environment (or a cloud service provider on behalf of the tenants) to set different policies for reclaiming cache entries utilized by the respective tenant. Additional details regarding flexible reclamation policies for tenants across multi-tenant processes are described with respect to FIGS. 10 and 11, as well as elsewhere herein.

Figure 2:
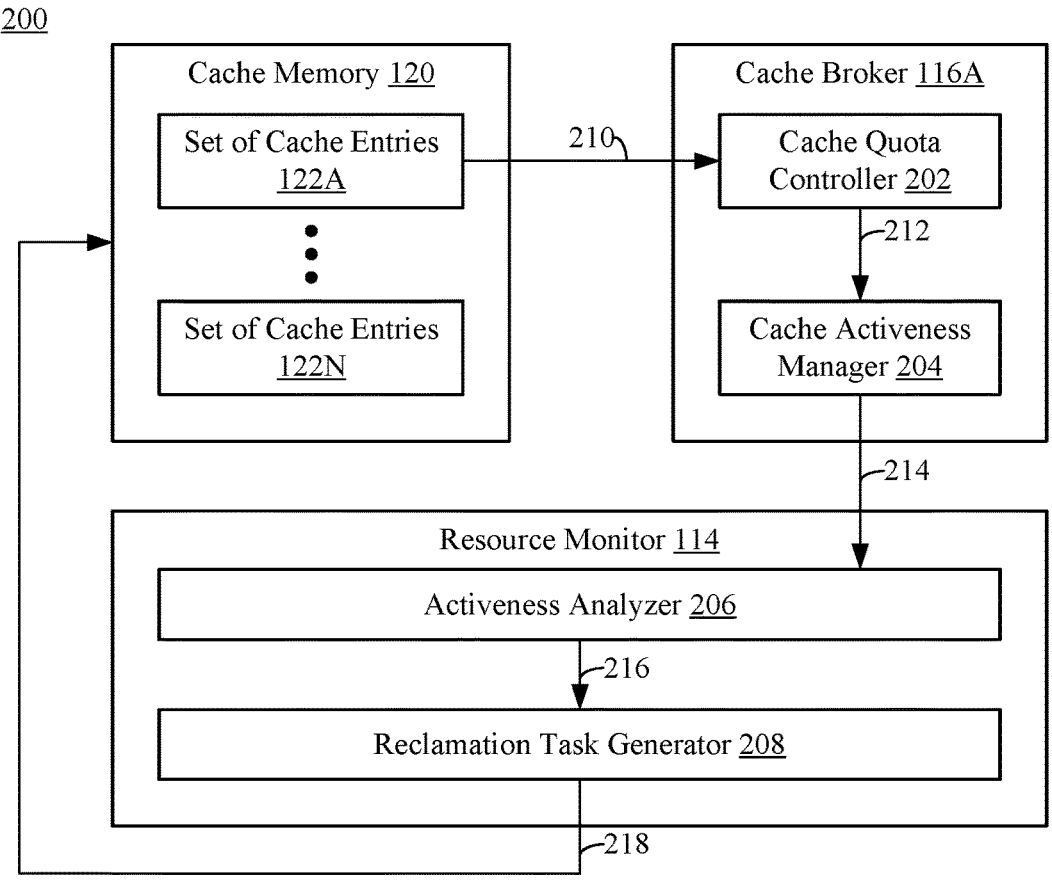
FIG. 2 shows a block diagram of a reclamation system for reclaiming a portion of cache memory, in accordance with an example embodiment.

As discussed above, techniques described herein may perform multi-tier memory reclamation in various ways, in embodiments. For example, FIG. 2 shows a block diagram of a reclamation system 200 ("system 200") for reclaiming a portion of cache memory, in accordance with an example embodiment. As shown in FIG. 2, system 200 includes resource monitor 114, cache broker 116A, and cache memory 120 (comprising sets of cache entries 122A-122N), as described with respect to FIG. 1. As also shown in FIG.

2, resource monitor 114 includes an activeness analyzer 206 and a reclamation task generator 208 and cache broker 116A includes a cache quota controller 202 and a cache activeness manager 204. In accordance with an embodiment, each of activeness analyzer 206, reclamation task generator 208, cache quota controller 202, and cache activeness manager 204 are implemented as services executing on the same computing device. Alternatively, any of the components of cache broker 116A and/or resource monitor 114 are executed on separate computing devices configured to communicate with each other over a network (e.g., network 108, an internal network of server infrastructure 104, and/or the like).

Figure 3:
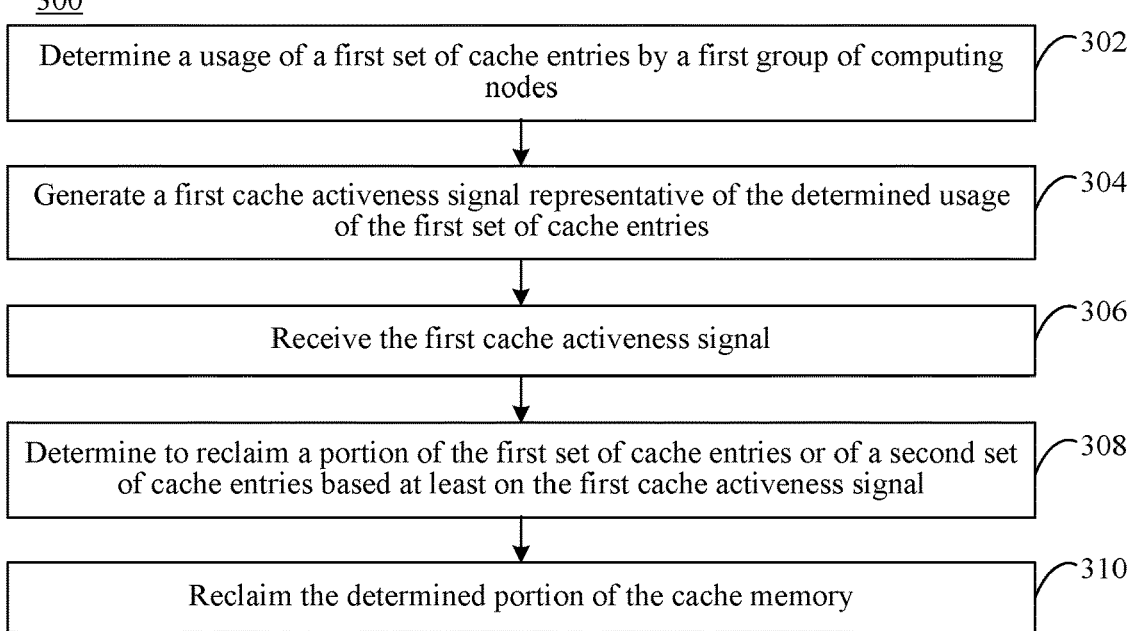
FIG. 3 shows a flowchart of a process for reclaiming a portion of cache memory, in accordance with an example embodiment.

For illustrative purposes, system 200 is described with respect to FIG. 3. FIG. 3 shows a flowchart 300 of a process for reclaiming a portion of cache memory, in accordance with an example embodiment. System 200 of FIG. 2 may operate according to flowchart 300 in embodiments. Not all steps of flowchart 300 need be performed in all embodiments. Further structural and operational embodiments will be apparent to persons skilled in the relevant art(s) based on the following descriptions of FIGS. 2 and 3.

Flowchart 300 begins with step 302. In step 302, a usage of a first set of cache entries by a first group of computing nodes is determined. For instance, cache quota controller 202 of FIG. 2 receives information 210 from set of cache entries 122A and determines the use of cache entries of set of cache entries 122A by resource group 118A of FIG. 1. In accordance with an embodiment, information 210 includes any changes to set of cache entries 122A since cache quote controller 202 last received information from set of cache entries 122A. For instance, suppose a new cache entry was initialized and assigned the resource group ID "Group A." In this context, information 210 indicates the cache entry and the assigned group ID. As shown in FIG. 1, information 210 is provided to cache quota controller 202. For example in accordance with an embodiment, information 210 is provided to cache quota controller 202 each time a cache entry is interacted with (e.g., by User A interacting with resource group 118A via user computing device 102A). Alternatively, cache quota controller 202 obtains information 210 by querying set of cache entries 122A and/or monitoring set of cache entries 122A to detect changes. Cache quota controller 202 determines the usage of set of cache entries 122A based on information 210, generates a usage signal 212 indicative of the cache entries utilized by nodes of Group A, and provides usage signal 212 to cache activeness manager 204.

In step 304, a first cache activeness signal is generated. The first cache activeness signal is representative of the determined usage of the first set of cache entries. For example, cache activeness manager 204 of FIG. 2 generates a cache activeness signal 214 representative of the determined usage of set of cache entries 122A. Depending on the implementation, cache activeness signal 214 may indicate a usage of set of cache entries 122A by resource group 118A and/or indicate the usage has a predetermined relationship with a threshold, as well as other information associated with set of cache entries 122A, resource group 118A, and/or cache broker 116A. In accordance with an embodiment, and as shown in FIG. 2, cache activeness manager 204 generates cache activeness signal 214 based at least on usage signal 212. In accordance with another embodiment, cache activeness manager 204 generates cache activeness signal 214 based at least on the determined usage (as indicated in usage signal 212) and global cache usage data indicative of the utilization of all cache entries of cache memory 120. Additional details regarding the generation of cache activeness signals are described with respect to FIGS. 4-6, as well as elsewhere herein.

In step 306, the first cache activeness signal is received. For example, activeness analyzer 206 of FIG. 2 receives cache activeness signal 214 from cache activeness manager 204. In accordance with an embodiment, cache activeness signal 214 is transmitted to activeness analyzer 206 automatically (e.g., in response to generation thereof by cache activeness manager 204). Alternatively, activeness analyzer 206 queries cache broker 116A and/or a component thereof (e.g., cache activeness manager 204) for cache activeness signal 214. In accordance with another alternative embodiment, cache activeness manager 204 stores cache activeness data in a data store (not shown in FIG. 2) and activeness analyzer 206 obtains the stored cache activeness data from the data store as a cache activeness signal.

In step 308, a determination to reclaim a portion of the first set of cache entries or of a second set of cache entries is made based at least on the first cache activeness signal. For example, activeness analyzer 206 of FIG. 2 determines to reclaim a portion of a set of sets of cache entries 122A-122N based at least on cache activeness signal 214. In accordance with one or more embodiments, cache activeness signal 214 includes an indication of the usage of set of cache entries 122A by resource group 118A and activeness analyzer 206 determines to reclaim the portion of the set of sets of cache entries 122A-122N based at least on determining the usage of set of cache entries 122A by resource group 118A has a predetermined relationship with a threshold. In accordance with an embodiment, activeness analyzer 206 determines the portion based on the type of cache entries (e.g., buffer pools, internal caches, etc.). Additional details regarding resource monitor 114 determining the usage of a set of cache entries by a respective resource group has a predetermined relationship with a threshold are described with respect to FIGS. 7-12, as well as elsewhere herein.

As noted above, activeness analyzer 206 in accordance with one or more embodiments determines to reclaim a portion of a set of sets of cache entries 122A-122N based at least on the indication of usage included in cache activeness signal 214. Alternatively, cache activeness signal 214 includes an indication that the usage of set of cache entries 122A has a predetermined relationship with a threshold (e.g., as determined by cache broker 116A). In this context, activeness analyzer 206 determines which portion of which sets of sets of cache entries 122A-122N to reclaim based at least on the indication included in cache activeness signal 214. Additional details regarding cache brokers (such as cache broker 116A) determining usage of respective sets of cache entries by respective resource groups are described with respect to FIGS. 4-6, as well as elsewhere herein.

In accordance with an embodiment, activeness analyzer 206 determines how many cache entries of a set of cache entries (e.g., of sets of cache entries 122A-122N) to reclaim based at least on cache activeness signal 214. For instance, as further described with respect to FIG. 5, activeness analyzer 206 (or a component of cache broker 116A) determines a soft limit of resource group 118A is reached and determines to (e.g., gradually or slowly) reclaim cache entries of set of cache entries 122A. In accordance with another embodiment, activeness analyzer 206 determines a hard limit of resource group 118A is reached and determines to reclaim a predetermined number of cache entries of set of cache entries 122A (e.g., 3% of cache entries).

Figure 8:
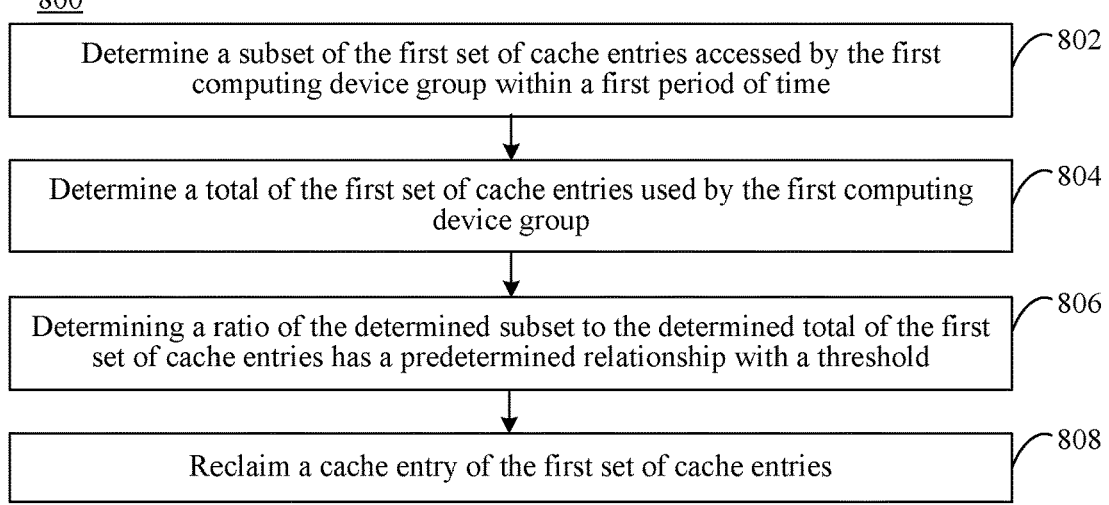
FIG. 8 shows a flowchart of a process for reclaiming a cache entry based on usage of cache entries, in accordance with an example embodiment.

Depending on the implementation, the determined portion of cache memory may be a number of cache entries or a reclamation target size of memory. As a non-limiting example, suppose activeness analyzer 206 determines to reclaim an external large cache. In this context, activeness analyzer 206 determines a reclamation target size of memory to shrink the large cache by (also referred to as a "direct shrink reclamation target"). For instance, activeness analyzer 206 may determine a direct shrink reclamation target (Target$_{DSR}$) according to the following equation:

$$\text{Target}_{DSR} = \text{MIN}\left(\frac{LE_{TOTAL}}{2}, LE_{TOTAL} - LE_{Active}\right) \cdot AvgLESize \qquad \text{Equation 1}$$

wherein LE$_{TOTAL}$ is the total number of large cache entries used by the resource group (e.g., large cache entries of set of cache entries 122A used by resource group 118A), LE$_{Active}$ is the number of large cache entries actively used by the group (also referred to as "hot" cache entries, additional details of which are described with respect to FIG. 8, as well as elsewhere herein), and AvgESize is the average size of individual cache entries of the large cache entries of the set of cache entries.

In another aspect, activeness analyzer 206 determines to "flush" cache entries (e.g., reclaim all cache entries) for a particular resource group. For instance, in accordance with an embodiment, activeness analyzer 206 determines (based at least on cache activeness signal 214) a user associated with resource group 118A has been idle for a predetermined time, the user's account associated with resource group 118A has been deactivated, resource group 118A is logically paused, and/or any other criteria in which the cache entries associated with resource group 118A are to be reclaimed. In some embodiments, the number of cache entries in set of cache entries 122A is below a threshold to trigger a process-wide memory reclamation task. For instance, suppose resource group 118A is a relatively small number of nodes and set of cache entries 122A comprise a (e.g., relatively) small number of cache entries compared to the total number of cache entries in cache memory 120. Further suppose resource group 118A and set of cache entries 122A are idle for a predetermined amount of time and (in this non-limiting example) the number of cache entries in set of cache entries 122A is lower than the threshold required by resource monitor 114 to trigger process-wide memory reclamation. However, cache broker 116A generates cache activeness signal 214 indicating set of cache entries 122A is idle for the predetermined amount of time. In this context, activeness analyzer determines to reclaim set of cache entries 122A based on the indication included in cache activeness signal 214, thereby reducing performance pressure to the rest of cache memory 120. As an alternative example, suppose activeness analyzer 206 determines set of cache entries 122A is idle for the predetermined amount of time (e.g., based on activeness analyzer 206 not receiving cache activeness signal 214 from cache activeness manager 204 within a time period of the predetermined amount of time, based on cache activeness signal 214 indicating set of cache entries 122A is idle and activeness analyzer 206 determining the predetermined amount of time has passed, etc.). In this context, activeness analyzer 206 (or another component of resource monitor 114 (e.g., a clock or timer not shown in FIG. 2) tracks the amount of time set of cache entries 122A is idle and, in response to the amount of time meeting (and/or exceeding) the predetermined amount of time (e.g., a time threshold), determines to flush set of cache entries 122A.

As noted above, activeness analyzer 206 may determine to flush cache entries for a logically paused resource group. For instance, suppose resource group 118A is logically paused. In this context, cache activeness signal 214 received from cache broker 116A includes an indication that resource group 118A is logically paused and activeness analyzer 206 determines to flush set of cache entries 122A. A logical pause interval may be shorter than the time limit to trigger an idle memory reclamation or an idle process wide memory reclamation. Thus, by enabling cache broker 116A to determine resource group 118A is logically paused and activeness analyzer 206 is able to determine to selectively reclaim set of cache entries 122A more quickly, thereby increasing efficiency in the use of cache memory 120 and reducing pressure on other resource groups utilizing cache entries of cache memory 120.

In another aspect, activeness analyzer 206 increases the frequency in which it determines to reclaim cache entries based on cache activeness signal 214. For instance, suppose in a non-limiting example activeness analyzer 206 evaluates whether to reclaim a portion of set of cache entries 122A based on cache activeness signal 214 (and optionally other data associated with resource group 118A, the use of set of cache entries 122A, and/or cache broker 116A) and without evaluating data with respect to other resource groups of a cluster and their respective uses of cache entries of cache memory 120. In this context, less compute resources are required to determine if a portion of (or all of) set of cache entries 122A should be reclaimed. Thus, activeness analyzer 206 in accordance with an embodiment frequently evaluates whether or not to reclaim a portion (or all of) set of cache entries 122A, thereby increasing the efficiency in use of cache memory 120 (e.g., without increasing compute resources used to determine whether to reclaim cache entries).

In another aspect, and as further described with respect to FIGS. 10 and 12, activeness analyzer 206 identifies a "bully" user or tenant account (e.g., a user or tenant account that is utilizing a predetermined percentage of cache memory in comparison to other accounts) based on cache activeness signal 214 (and/or other cache activeness signals received from other cache brokers not shown in FIG. 2 (e.g., cache broker 116N)). Thus, activeness analyzer 206 selectively determines to reclaim cache entries utilized by the bully account, thereby reducing pressure on other resource groups utilizing cache memory 120. In a further aspect, resource monitor 114 or a corresponding cache broker of cache brokers 116A-116N implements a soft limit to gradually reduce the use of cache memory 120 by the bully account.

In any case, as shown in FIG. 2, activeness analyzer 206 generates an indication 216 that indicates the portion of a set of sets of cache entries 122A-122N to be reclaimed and provides indication 216 to reclamation task generator 208. In accordance with an embodiment, indication 216 indicates specific cache entries of a set of sets of cache entries 122A-122N to be reclaimed (e.g., Cache Entry 1, Cache Entry 3, and Cache Entry 7 of set of cache entries 122A, not shown in FIG. 2 for brevity). Alternatively, indication 216 indicates a proportion of cache entries (e.g., a percentage) of a set of sets of cache entries 122A-122N to be reclaimed (e.g., reclaim 3% of cache entries of set of cache entries 122A).

In step 310, the determined portion of the cache memory is reclaimed. For example, reclamation task generator 208 receives indication 126 and generates a reclamation task 218. Reclamation task generator 208 transmits reclamation task 218 to cache memory 120, causing the determined portion of the cache memory to be reclaimed. In accordance with an embodiment, reclamation task 218 indicates which (e.g., specific) cache entries of cache memory 120 to reclaim. In accordance with an embodiment, reclamation task generator 208 generates reclamation task 218 by including a reclamation target that is calculated as the sum of cache entries to reclaim for resource group 118A. In accordance with an embodiment, reclamation task 218 includes a flag that indicates it is a "partial" reclamation task (i.e., a reclamation task that reclaims cache entries from select sets of cache entries of cache memory 120, as opposed to a process-wide reclamation task).

In accordance with an embodiment reclamation task 218 includes instructions to move a clock hand of cache memory 120 that, when moved, causes the determined portion of the cache memory to be reclaimed. For instance, suppose reclamation task 218 is a function call of cache memory 120 (e.g., a "CacheClockHand_MoveInternal( )" function call) that includes a resource group ID of the determined portion of the cache memory. In this context, cache memory, in response to the function call, moves a clock hand of cache entries with the included resource group ID, thereby decommitting a predetermined number of cache entries.

In accordance with an embodiment, reclamation task 218 includes identifiers of cache entries to reclaim (i.e., as determined by activeness analyzer 206). Alternatively, reclamation task 218 indicates a type of cache entries to reclaim (e.g., cache entries that have not been used for a predetermined amount of time, also referred to as "cold" cache entries elsewhere herein), a number of cache entries to reclaim, and/or a size of memory to reclaim (e.g., bits, bytes, kilobytes, megabytes, gigabytes, etc.). In this context, cache memory 120 (or a manager component of cache memory 120 not shown in FIG. 1) receives reclamation task 218 and evicts cache entries based on reclamation task 218. As a non-limiting example, suppose cache memory 120 comprises a buffer pool and reclamation task 218 includes instructions to reclaim buffer pool pages used by resource group 118A. In this example, further suppose that reclamation task 218 is a function call to the buffer pool with an indicator that specifies a number of buffer pool pages to decommit and the resource group the buffer pool pages are associated with (resource group 118A). The buffer pool identifies cold buffer pages associated with resource group 118A and decommits a number of the identified cold buffer pool pages based on the function call. In accordance with a further embodiment, the buffer pool identifies cold buffer pages as buffer pages with a "time since last used" greater than or equal to a "cut off" limit.

In accordance with one or more embodiments, reclamation task 218 includes instructions to reclaim cache entries from multiple sets of sets of cache entries 122A-122N. For instance, reclamation task generator 208 in accordance with an embodiment generates reclamation task 218 in response to multiple (e.g., separate, concurrent, or sequential) determinations made by activeness analyzer 206. As a first non-limiting example, suppose activeness analyzer 206 in step 308 determines that cache entries of sets of cache entries 122A and 122N include cold cache entries (e.g., a predetermined amount of cache entries that have not been accessed for a predetermined amount of time), but other sets of sets of cache entries 122A-122N (not shown in FIG. 2) do not include cold cache entries (or do not include a number of cold cache entries that meets a threshold for that respective set of cache entries). In this context, reclamation task generator 208 generates a reclamation task 218 that includes instructions to reclaim cold cache entries of set of cache entries 122A and set of cache entries 122N (but not cache entries of other sets of cache entries of cache memory 120) and transmits reclamation task 218 to cache memory 120. As a second non-limiting example, suppose activeness analyzer 206 (e.g., separately, concurrently, or sequentially) determines that a soft limit of set of cache entries 122A is reached and resource group 118N is logically paused. In this context, reclamation task generator 208 generates reclamation task 218 to include instructions to (e.g., gradually) reclaim a portion of set of cache entries 122A and to flush set of cache entries 122N, and transmits reclamation task 218 to cache memory 120. In accordance with an embodiment where reclamation task 218 includes instructions to reclaim cache entries from sets of sets of cache entries 122A-122N, reclamation task 218 includes instructions to reclaim cache entries from corresponding sets of sets of cache entries 122A-122N based on determinations made by activeness analyzer 206 in a predetermined time period (e.g., in the last minute, hour, day, and/or the like; in the last number of seconds, number of minutes, number of hours, number of days, and/or the like).

In FIG. 2, reclamation task generator 206 is depicted as generating a single reclamation task 218; however it is also contemplated herein that reclamation task generator 206 may generate a plurality of reclamation tasks (e.g., separately, concurrently, or sequentially). For instance, reclamation task generator 206 in accordance with an embodiment generates a reclamation task for each determination made by activeness analyzer 206 in a predetermined time period. Each reclamation task includes instructions to reclaim a corresponding portion of cache memory 120. Reclamation task generator 206 transmits (e.g., simultaneously or sequentially) the generated reclamation tasks to cache memory 120.

III. Example Embodiments of Cache Activeness Management

As described herein, embodiments of cache brokers monitor use of cache entries by a respective group of computing nodes to determine a usage of the cache entries. Depending on the implementation, the cache broker may maintain usage data in a data store based on the determined usage, update usage data stored in an external data store based on the determined usage, analyze the usage data to generate an activeness signal, and/or provide the usage data to a resource monitor for analysis thereof. In other words, a cache broker manages the cache activeness with respect to a respective group of computing nodes.

Cache brokers may be configured to manage cache activeness in various ways, in embodiments. For example, FIG. 4 shows a block diagram of a system 400 for managing cache activeness, in accordance with an embodiment. Further structural and operational embodiments will be apparent to persons skilled in the relevant art(s) based on the following description of FIG. 4. As shown in FIG. 4, system 400 comprises cache broker 116A (comprising cache quota controller 202 and cache activeness manager 204) and resource monitor 114 (comprising activeness analyzer 206 and reclamation task generator 208) as described with respect to FIG. 2 and a data storage 408. As also shown in FIG. 4, cache activeness manager 204 comprises a limit analyzer 402, a usage updater 404, and an activeness signal generator 406.

Data storage 408 stores group A usage data 410, global cache usage data 412, and/or any other information described herein (e.g., usage data of other resource groups). As shown in FIG. 4, data storage 408 is external to cache broker 116A and resource monitor 114; however, it is also contemplated that all or a portion of data storage 408 may be internal to a computing device executing either of cache broker 116A and/or resource monitor 114. Furthermore, data storage 408 may be included in a storage node of clusters 110A-110N of FIG. 1, or in a storage device external to server infrastructure 104 of FIG. 1.

As noted above, cache activeness manager 204 of FIG. 4 comprises limit analyzer 402, usage updater 404, and activeness signal generator 406, each of which may be subservices of cache activeness manager 204. Usage updater 404 receives usage signal 212 from cache quota controller 202 and updates usage data stored in data storage 408 based on determined usage indicated by usage signal 212. For instance, usage updater 404 determines the usage data to update (e.g., which cache entries of sets of cache entries 122A are used, which cache entries have been interacted with, whether cache entries are idle, cache entries that have been added to sets of cache entries 122A, and/or any other usage determined by cache quota controller 202). Usage updater 404 transmits a usage update signal 414 to data storage 408 to update data stored by data storage 408. Depending on the implementation, usage update signal 414 updates usage data for the resource group associated with cache broker 116A (e.g., Group A usage data 410 of resource group 118A) and/or global cache usage data representative of usage of cache memory 120 by (e.g., all) resource groups of cluster 110A (e.g., global cache usage data 412). In accordance with an embodiment, usage updater 404 generates usage update signal 414 whenever a cache entry is created, pinned, or freed. In accordance with an embodiment, usage update signal 414 includes a resource group ID associated with the created, pinned, or freed cache entries (e.g., a resource group ID of resource group 118A), thus enabling the usage of cache entries (sets of cache entries 122A) by a particular resource group (e.g., resource group 118A) to be tracked by system 400.

As shown in FIG. 4, Group A usage data 410 is stored and/or tracked separately from (i.e., in addition to) global cache usage data 412. However, it is also contemplated herein that Group A usage data 410 may be a subset of global cache usage data 412. For instance, suppose global cache usage data 412 comprises Group A usage data 410 and/or usage data for other resource groups of cluster 110A (and/or other clusters of server infrastructure 104). In this context, global cache usage data 412 includes multiple subsets of data that are each associated with respective resource group IDs (e.g., Group A usage data 410 is a subset of global cache usage data 412 and is associated with the ID of resource group 118A). This enables components of reclamation systems (e.g., cache brokers resource monitors, and/or components of cache brokers and/or resource monitors) to determine activeness of a particular set of cache entries, multiple sets of cache entries, and/or the entire cache memory while reducing redundancy in stored data. Furthermore, by consolidating usage data for each resource group, cache brokers of the same cluster are able to access the same data store (e.g., global cache usage data 412 stored in data storage 408) for obtaining usage data (e.g., of the resource group associated with the cache broker, of other resource groups, of the entire cluster, etc.).

In accordance with an embodiment, global cache usage data 412 and/or Group A usage data 410 separately track (e.g., store) usage data based on the type of cache memory. For instance, in accordance with an embodiment, global cache usage data 412 includes a first object that tracks activeness statistics for internal caches (e.g., cache stores, user stores, object stores, etc.) and a second object that tracks activeness statistics for external caches (e.g., buffer pools, column stores, etc.).

Limit analyzer 402 receives usage signal 212 from cache quota controller 202, analyzes usage signal 212 to determine if the usage of sets of cache entries 122A has a predetermined relationship with a threshold, and, if the usage of sets of cache entries 122A does have a predetermined relationship with a threshold, transmits a limit indication 418 to activeness signal generator 406. Limit analyzer 402 may determine if usage of sets of cache entries 122A has a predetermined relationship with a threshold in various ways. For instance, in accordance with an embodiment, limit analyzer 402 determines usage of sets of cache entries 122A has reached an "internal memory pressure limit" of cache broker 116A. In this context, "internal memory pressure" indicates a usage of cache memory by a resource group (e.g., the use of set of cache entries 122A by resource group 118A). In accordance with an embodiment, the internal memory pressure limit is a hard limit (e.g., a limit wherein a predetermined number of cache entries are to be reclaimed). Alternatively, and as described further with respect to FIG. 5, the internal memory pressure limit is a soft limit. In a further aspect, limit analyzer 402 analyzes usage signal 212 with respect to multiple limits (e.g., a soft internal pressure limit and a hard internal pressure limit).

In some embodiments, and as also shown in FIG. 4, limit analyzer 402 obtains data 416 from data storage 408. Depending on the implementation, data 416 may include some or all of Group A usage data 410, some or all of global cache usage data 412, and/or some or all of any other data stored by data storage 408 (not shown in FIG. 4). In accordance with one or more embodiments, limit analyzer 402 generates limit indication 418 based on data 416 (in addition to and/or in lieu of usage signal 212). Depending on the implementation, limit analyzer 402 may obtain data 416 in response to receiving usage signal 212, obtains data 416 concurrent to receiving usage signal 212, obtains data 416 in response to updates to data stored by data storage 408 (e.g., via usage updater 404 updating group A usage data 410 and/or global cache usage data 412, via another cache broker updating global cache usage data 412, via resource monitor 114 updating global cache usage data 412, etc.), periodically obtain data 416 from data storage 408, and/or otherwise obtains data 416 from data storage 408, as described elsewhere herein or as would be understood by a person ordinarily skilled in the relevant art(s) having benefit of this disclosure. Limit analyzer 402 in accordance with one or more embodiments analyzes data 412 (e.g., in lieu of or in addition to usage signal 212) to determine if usage of sets of cache entries 122A has a predetermined relationship with a threshold. For instance, limit analyzer 402 in accordance with an embodiment determines usage of sets of cache entries 122A has reached an "internal memory pressure limit" of cache broker 116A based at least on data 412. In accordance with another embodiment, and as further described with respect to FIG. 6, limit analyzer 412 determines an "external pressure limit" of cache broker 116A has been reached based at least on data 412. In this context, "external pressure" (or "external memory pressure") indicates a usage of memory by more than one resource group (e.g., a subset of resource groups 118A-118N and/or the entirety of resource groups 118A-118N).

Activeness signal generator 406 receives limit indication 418 and generates cache activeness signal 214 based at least on limit indication 418. In this context, cache activeness signal 214 specifies which limits are reached (e.g., as indicated by limit indication 418) and, optionally, usage of sets of cache entries 122A by resource group 118A (e.g., as indicated by usage signal 212, data 416, and/or Group A usage data 410). For example, activeness signal generator 406 in accordance with an embodiment generates cache activeness signal 214 to include an "internal pressure indicator" in response to an internal pressure limit of cache broker 116A having been reached (e.g., as indicated by limit indication 418). In accordance with an embodiment where an external pressure limit of cache broker 116A is reached, activeness signal generator 406 generates cache activeness signal 214 to include an "external pressure indicator."

In embodiments, resource monitor 114 receives cache activeness signal 214, determines a portion of cache memory 120 to reclaim based at least on cache activeness signal 214, and generates indication 216 indicating the determined portion of cache memory 120 to reclaim, as described elsewhere herein. Reclamation task generator 208 receives indication 216 and generates reclamation task 218, as described elsewhere herein.

As noted above, cache activeness manager 204 (and/or components thereof) determines if limits of cache broker 116A are reached and, if so, generates cache activeness signal 214 indicating the limit is reached. In embodiments, resource monitor 114 determines to reclaim a portion of cache memory based on the indication of the limit being reached. Cache activeness manager 204 may determine limits are reached and resource monitor 114 may determine to reclaim memory based on the reached limit in various ways, in embodiments. For example, FIG. 5 shows a flowchart 500 of a process for reclaiming a subset of cache entries based on an indication that a soft limit is reached, in accordance with an embodiment. System 400 may operate according to flowchart 500 in embodiments. Note that not all steps of flowchart 600 need be performed in all embodiments. Further structural and operation embodiments will be apparent to persons skilled in the relevant art(s) based on the following descriptions of FIGS. 4 and 5.

Flowchart 500 begins with step 502. In step 502, a determination that a soft limit is reached is made based at least on the determined usage of the first set of cache entries. For example, limit analyzer 402 of FIG. 4 determines that a soft limit of cache broker 116A is reached based at least on usage signal 212 and generates limit indication 418 indicating the soft limit is reached.

The value of the soft limit for a resource group may be configured in various ways, in embodiments. For instance, a reclamation policy of a service provider of the cloud service and/or a tenant or user of resource group 118A may set the value of the soft limit (or a range in which the soft limit may vary). In accordance with a non-limiting example, the soft limit for resource group 118A ($\text{Limit}_{SOFT}$) is calculated according to the following equation:

$$\text{Limit}_{SOFT} = E_{TOTAL} - \text{MIN}\left(\frac{E_{TOTAL}}{2}, E_{TOTAL} - E_{Active}\right) \qquad \text{Equation 2}$$

Where $E_{TOTAL}$ is the total number of entries used by resource group 118A (e.g., set of cache entries 122A) and $E_{ACTIVE}$ is the number of cache entries actively used by the group (also referred to as "hot" cache entries). Additional details regarding determining "hot" cache entries and "cold" cache entries (also referred to as inactive cache entries) are described with respect to FIG. 8, as well as elsewhere herein. In this example, if the number of cache entries actively used by resource group 118A rises above half of $E_{TOTAL}$, $Limit_{SOFT}$ is met and limit analyzer 402 generates limit indication 418.

Flowchart 500 continues to step 504. Step 504 is a further embodiment of step 304 of flowchart 300, as described with respect to FIG. 3. In step 504, the first cache activeness signal is generated to include an indication the soft limit is reached. For example, activeness signal generator 406 of FIG. 4 receives limit indication 418 and generates cache activeness signal 214 to include limit indication 418 (indicating the soft limit is reached). In accordance with an embodiment, activeness signal generator 406 includes other information in cache activeness signal 214 (e.g., usage of usage signal 212, the group ID of resource group 118A, indications that other limits are reached (as determined by limit analyzer 402, and as described elsewhere herein) and/or any other information associated with the activeness of cache entries monitored by cache broker 116A).

Flowchart 500 continues to step 506. Step 506 is a further embodiment of step 308 of flowchart 300, as described with respect to FIG. 3. In step 506, a determination to reclaim a subset of the first set of cache entries is made based at least on the indication the soft limit is reached. For example, activeness analyzer 206 of FIG. 4 receives cache activeness signal 214 (including the indication the soft limit is reached) from activeness signal generator 406 and determines to reclaim a subset of set of cache entries 122A based at least on the indication included therein. In accordance with an embodiment, activeness analyzer 206 determines the subset of set of cache entries 122A to be reclaimed based on a reclamation policy of cluster 110A (e.g., a reclamation policy set by an admin of cluster 110A, an admin of the cloud service, and/or the like) or a reclamation policy of resource group 118A (e.g., a reclamation policy set by an admin of resource group 118A, a user of resource group 118A, a tenant of resource group 118A, and/or the like).

Thus, an example process for determining to reclaim cache memory based on a soft limit being reached has been described with respect to FIGS. 4 and 5. By detecting internal memory pressure for resource group 118A, cache broker 116A of FIG. 4 is able to resource monitor 114 that the soft limit has been reached for resource group 118A, which allows resource monitor 114 to (e.g., gradually or slowly) evict cache entries of set of cache entries 122A for resource group 118A.

As noted above, cache brokers may monitor external memory pressure to determine if an external pressure limit has been reached. Cache brokers and/or resource monitors may reclaim cache entries based on monitoring external memory pressure in various ways, in embodiments. For example, FIG. 6 shows a flowchart 600 of a process for reclaiming a portion of cache memory based on an indication that an external pressure limit is reached, in accordance with an embodiment. System 400 may operate according to flowchart 600 in embodiments. Note that not all steps of flowchart 600 need be performed in all embodiments. Further structural and operation embodiments will be apparent to persons skilled in the relevant art(s) based on the following descriptions of FIGS. 4 and 6.

Flowchart 600 starts with step 602. In step 602, a determination an external pressure limit is reached is made based at least on the determined usage of the first set of cache entries and global cache data. The global cache usage data is representative of usage of the cache memory by the cluster of computing nodes. For example, limit analyzer 402 of FIG. 4 receives usage signal 212 (indicative of the determined usage of set of cache entries 122A) and obtains data 416, data 416 including global cache usage data 412 (representative of usage of cache memory 120 by cluster 110A). Limit analyzer 402 determines if an external pressure limit is reached based on received usage signal 212 and obtained data 416. For example, suppose the global cache data of data 416 indicates usage of cache memory 120 by cluster 110A is at or above a global cache usage threshold. In this context, limit analyzer 402 determines the external pressure limit is reached, generates limit indication 418 indicating the external pressure limit is reached, and provides limit indication 418 to activeness signal generator 406.

Flowchart 600 continues to step 604. Step 604 is a further embodiment of step 304 of flowchart 300, as described with respect to FIG. 3. In step 604, the first cache activeness signal is generated to include an indication the external pressure limit is reached. For example, activeness signal generator 406 of FIG. 4 receives limit indication 418 and generates cache activeness signal 214 to include limit indication 418 (indicating the external pressure limit is reached). In accordance with an embodiment, activeness signal generator 406 includes other information in cache activeness signal 214 (e.g., usage of usage signal 212, the group ID of resource group 818A, indications that other limits are reached (as determined by limit analyzer 402, and as described elsewhere herein) and/or any other information associated with the activeness of cache entries monitored by cache broker 116A).

Flowchart 600 continues to step 606. Step 606 is a further embodiment of step 308 of flowchart 300, as described with respect to FIG. 3. In step 606, a determination to reclaim the portion of the cache memory is made based at least on the indication the external pressure limit is reached. For example, activeness analyzer 206 of FIG. 4 receives cache activeness signal 214 (including the indication the external pressure limit is reached) from activeness signal generator 406 and determines to reclaim a portion of cache memory 120 based at least on the indication included therein. In accordance with an embodiment, activeness analyzer 206 determines to reclaim a portion of set of cache entries 122A. For instance, suppose the external pressure limit of cache broker 116A is reached and activeness analyzer 206 performs further analysis (as described elsewhere herein, e.g., with respect to FIG. 8) on the utilization of set of cache entries 122A by resource group 118A, identifies a number of "cold" cache entries in set of cache entries 122A, and determines to reclaim the identified cold cache entries. In accordance with another embodiment, activeness analyzer 206 determines to reclaim a portion of a set of cache entries other than set of cache entries 122A (e.g., of set of cache entries 122N). For instance, suppose the external pressure limit of cache broker 116A is reached and activeness analyzer 206 performs further analysis (as described elsewhere herein, e.g., with respect to FIG. 12) on utilization of set of cache entries 122N by resource group 118N, determines resource group 118N is a "bully" tenant, and determines to reclaim cache entries of sets of cache entries 122N.

FIG. 6 is described with respect to cache broker 116A detecting an external pressure limit; however, in some embodiments, resource monitor 114 receives cache activeness signals from cache brokers (e.g., receives cache activeness signal 214 from cache broker 116A) and determines whether or not an external pressure limit has been reached. Additional details regarding a resource monitor determining that an external pressure limit has been reached are described with respect to FIG. 9, as well as elsewhere herein.

Thus, an example process for reclaiming a subset of cache entries based on an indication that a soft limit is reached has been described with respect to FIGS. 4 and 5, and an example process for reclaiming a portion of cache memory based on an indication that an external pressure limit is reached has been described with respect to FIGS. 4 and 6. It is also contemplated herein that limit analyzer 402 may be used to determine if other limits of cache broker 116A (or resource group 118A monitored by cache broker 116A) have been reached based at least on the utilization of set of cache entries 122A. For instance, in accordance with an embodiment, cache broker 116A determines if a ratio of "hot" cache entries to the total number of entries in set of cache entries 122 is below a threshold. Additional details regarding determining if ratios of hot to total entries in a set of cache entries is below a threshold are discussed with respect to FIG. 8, as well as elsewhere herein.

In accordance with one or more embodiments, a limit analyzer such as limit analyzer 402 determines whether to generate limit indication 418 automatically (e.g., in response to usage signal 212 and/or data 416). Alternatively, limit analyzer 402 obtains usage signal 212 and determines whether to generate limit indication 418 in response to a signal received from resource monitor 114 (not shown in FIG. 4). For example, suppose resource monitor 114 calls a function to adjust memory usage targets for resource groups of cluster 110A. In this example, each cache broker determines if a utilization of a corresponding set of cache entries by the resource group corresponding to the cache broker has reached a limit indication.

In accordance with a further embodiment, each cache broker adjusts a limit (e.g., the soft internal pressure limit) in response to a call from resource monitor 114. As a non-limiting example, suppose limit analyzer 402 determines resource group 118A's utilization of set of cache entries 122A is above a soft limit threshold of cache broker 116A (e.g., the ratio of "hot" cache entries to total entries of set of cache entries 122A is above the soft limit threshold) and limit indication 418 is not generated. Furthermore, suppose resource monitor 114 has determined that the process-wide usage of cache memory 120 has reached a limit of resource monitor 114. In this example, resource monitor 114 generates a call to cache brokers 116A-116N to increase the soft limit thresholds of the respective cache brokers by a percentage or a number of entries. Further suppose limit analyzer 402 (e.g., in response to the call from resource monitor 114) determines the ratio of "hot" cache entries to total entries of set of cache entries 122A is below the adjusted soft limit threshold and generates limit indication 418 indicating the adjusted soft limit threshold is reached. Activeness signal generator 406 generates cache activeness signal 214 including the indication, activeness analyzer 206 determines to gradually reclaim cold cache entries of set of cache entries 122A, and reclamation task generator 208 generates reclamation task 218 to reclaim the determined cold cache entries, as described elsewhere herein. By adjusting limits in this manner, resource monitor 114 reduces the need to trigger process-wide memory reclamation tasks; thereby reducing the potential negative impact on resource groups in a cluster.

Thus, detecting limits (such as external and internal pressure limits) utilizing a cache broker in various ways has been described with respect to FIGS. 4-6. By having individual cache brokers monitor usage and determine if limits have been reached, a resource monitor (such as resource monitor 114) is not required to directly track usage and determine if limits have been reached for the individual resource groups. Instead, as a non-limiting example, a resource monitor responds to indications provided by the individual cache brokers. In accordance with a further embodiment, and as described further with respect to FIG. 7, a resource monitor may track the status of indications generated by the individual cache brokers (e.g., without directly determining if the limits have been reached).

IV. Example Embodiments of Resource Monitors for Analyzing Activeness

Figure 7:
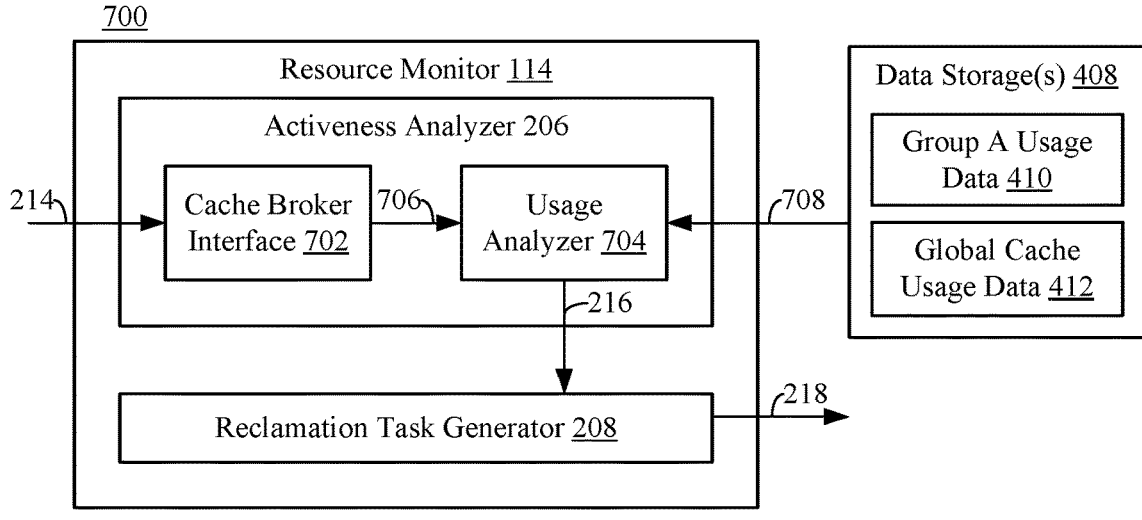
FIG. 7 shows a block diagram of the resource monitor of FIG. 1, in accordance with an example embodiment.

As described herein, embodiments of resource monitors receive a cache activeness signal from a cache broker and determine to reclaim a portion of cache memory based at least on the received cache activeness signal. Depending on the implementation, a resource monitor may determine the portion of cache memory to reclaim based on a single cache activeness signal received from a cache broker, multiple cache activeness signals received from respective cache brokers, usage data for one or more resource groups, global cache usage data for the cache memory (e.g., for all resource groups utilizing the cache memory), and/or other information suitable for determining a portion of cache memory to reclaim, as described herein. Resource monitors may be configured to determine a portion of cache memory to reclaim in various ways, in embodiments. For example, FIG. 7 shows a block diagram of a system 700 comprising resource monitor 114 of FIG. 1, in accordance with an example embodiment. Further structural and operational embodiments will be apparent to persons skilled in the relevant art(s) based on the following description of FIG. 7. As shown in FIG. 7, system 700 comprises resource monitor 114 (including activeness analyzer 206 and reclamation task generator 208 as described with respect to FIG. 2) and data storages 408 (including Group A usage data 410 and global cache usage data 412 as described with respect to FIG. 4). As also shown in FIG. 7, activeness analyzer 206 comprises a cache broker interface 702 and a usage analyzer 704, each of which may be subservices of activeness analyzer 206.

Cache broker interface 702 receives cache activeness signals from cache brokers of cluster 110A (e.g., cache brokers 116A-116N). For instance, as shown in FIG. 7, cache broker interface 702 receives cache activeness signal 214 (generated by cache broker 116A, as described with respect to FIGS. 2-6, as well as elsewhere herein). In embodiments, cache broker interface 702 may track indications included in cache activeness signals, track usage of sets of cache entries 122A-122N included in cache activeness signals, and/or update usage data (e.g., global cache usage data 412 and/or individual resource group usage data (e.g., Group A usage data 410)) based on received cache activeness signals. As shown in FIG. 7, cache broker interface 702 provides information 706 to usage analyzer 704. Information 706 in accordance with an embodiment includes usage information and/or indications included in cache activeness signals received by cache broker interface 702. In accordance with another embodiment, information 706 includes indications of changes in (or current status of) data tracked by cache broker interface 702.

In accordance with an embodiment, cache broker interface 702 tracks a multi-bit "group mask" where each bit corresponds to a resource group of the cluster resource monitor 114 is associated with (e.g., cluster 110A of FIG. 1). For instance, cache broker interface 702 in accordance with an embodiment comprises a multi-bit group mask (not shown in FIG. 7) that includes a $1^{st}$ bit corresponding to resource group 118A and an $n^{th}$ bit corresponding to resource group 118N (as well as other bits corresponding to resource groups of cluster 110A not shown in FIG. 1). In this context, bits are turned on in response to cache activeness signals (or indications included therein) received from the corresponding cache broker (e.g., the $1^{st}$ bit is turned on in response to cache activeness signal 214). For instance, if cache broker 116A determines a limit of cache broker 116A is reached, it includes an indication in cache activeness signal 214 that, when received by cache broker interface 702, causes the $1^{st}$ bit of the multi-bit group mask to turn on. In accordance with an embodiment, cache broker interface 702 tracks multiple bits per resource group (e.g., a first bit corresponding to an external pressure limit of the respective resource group, a second bit corresponding to a soft internal pressure limit of the respective resource group, a third bit corresponding to a hard internal pressure limit of the respective resource group, and/or any other number of bit corresponding to another limit or indication of a limit being reached, as described elsewhere herein). Alternatively, cache broker interface 702 tracks multiple multi-bit group masks, wherein each group mask corresponds to a type of limit indicated by respective cache brokers. In embodiments wherein cache brokers track usage of respective resource groups and usage analyzer 704 determines if the usage reported by the broker meets (or exceeds) a limit of the resource group, cache broker interface 702 (or another component of activeness analyzer 206) updates the corresponding group mask(s) based on the determinations made by usage analyzer 704.

In accordance with one or more embodiments using group masks to track limits reached by respective usage of cache memory 120 by respective resource groups, the corresponding bits of the group mask may be reset in various ways, in embodiments. For instance, in accordance with an embodiment, resource monitor 114 (or a component thereof) resets the bits of the group mask after a corresponding reclamation task generated by reclamation task generator 208 times out. Alternatively, resource monitor 114 (or a component thereof) periodically obtains updated cache activeness signals and/or usage data, determines if a limit should be reset (e.g., determining the cache activeness of a resource group is below a soft limit threshold and therefore the soft limit internal pressure limit for the resource group should be reset), and, if the limit should be reset, resets the bit corresponding to the limit. In accordance with another alternative embodiment, a cache broker transmits an updated cache activeness signal (not shown in FIG. 7) and resource monitor 114 (or a component thereof) determines if the limit should be reset based on the updated cache activeness signal.

Usage analyzer 704 receives information 706 from cache broker interface 702, analyzes information 706 to determine a portion of cache memory 120 to reclaim, and generates indication 216 indicating the determined portion of cache memory 120 to reclaim. In accordance with an embodiment where information 706 includes indications of one or more limits having been reached (e.g., a soft limit, a hard limit, an external pressure limit, etc.), usage analyzer 704 determines the portion of cache memory 120 to reclaim based on the indicated limit reached. In accordance with an embodiment where information 706 includes a determined usage of a set of cache entries by a resource group, usage analyzer 704 determines if a limit has been reached based on the determined usage, and, if a limit has been reached, determines the portion of cache memory 120 to reclaim based on the determined limit.

In some embodiments, and as also shown in FIG. 7, usage analyzer 704 obtains data 708 from data storage 408. Depending on the implementation, data 708 may include some or all of Group A usage data 410, some or all of global cache usage data 412, and/or some or all of any other data stored by data storage 408 (not shown in FIG. 7). In accordance with one or more embodiments, usage analyzer 704 determines the portion of cache memory 120 to reclaim and generates indication 216 based on data 708 (in addition to and/or in lieu of information 706). Depending on the implementation, usage analyzer 704 may obtain data 708 in response to receiving information 706, obtain data 708 concurrent to receiving information 706, obtain data 708 in response to updates to data stored by data storage 408 (e.g., via usage updater 404 updating group A usage data 410 and/or global cache usage data 412, via another cache broker updating global cache usage data 412, via resource monitor 114 updating global cache usage data 412, etc.), periodically obtain data 708 from data storage 408, and/or otherwise obtains data 708 from data storage 408, as described elsewhere herein or as would be understood by a person ordinarily skilled in the relevant art(s) having benefit of this disclosure. Usage analyzer 704 in accordance with one or more embodiments analyzes data 708 (e.g., in lieu of or in addition to information 706) to determine a portion of cache memory 120 to reclaim. For instance, usage analyzer 706 analyzes data 708 to determine if a limit of a cache broker or of resource monitor 114 has been reached (e.g., an internal memory pressure limit, an external memory pressure limit, a cold cache limit, a process-wide limit, and/or any other limit or threshold of a cache broker (e.g., of cache brokers 116A-116N), resource monitor 114, associated resource groups, and/or service providers, as described elsewhere herein). For instance, in accordance with an embodiment, and as described with respect to FIG. 8, usage analyzer 704 determines a ratio of "hot" (or "cold") cache entries to total cache entries used by a resource group and determines a portion of cache memory 120 to reclaim based on the determined ratio. In accordance with another embodiment, and as described with respect to FIG. 9, usage analyzer 704 determines an "external pressure limit" (e.g., of a cache broker, of a resource group, of resource monitor 114, etc.) has been reached based at least on data 708.

In any case, reclamation task generator 208 receives indication 126 and generates reclamation task 218, as described elsewhere herein.

As noted above, resource monitors, such as resource monitor 114 of FIG. 7, may determine a portion of cache memory to reclaim in various ways, in embodiments. For instance, FIG. 8 shows a flowchart 800 of a process for reclaiming a cache entry based on usage of cache entries, in accordance with an example embodiment. Resource monitor 114 of FIG. 7 may operate according to flowchart 800, in embodiments. Note that not all steps of flowchart 800 need be performed in all embodiments. Further structural and operation embodiments will be apparent to persons skilled in the relevant art(s) based on the following descriptions of FIGS. 7 and 8.

Flowchart 800 begins with step 802. In step 802, a subset of the first set of cache entries accessed by the first group of computing nodes within a first period of time is determined. For example, usage analyzer 704 of FIG. 7 determines a subset of set of cache entries 122A accessed by resource group 118A within a first period of time. In this context, the determined subset is a set of "hot" cache entries (also referred to as "active entries"). In accordance with an embodiment, information 706 (and/or cache activeness signal 214) includes an indication of the subset of cache entries accessed within a first period of time. Alternatively, usage analyzer 704 obtains data 708 from data storage 408, data 708 comprising a record of cache entries of set of cache entries 122A and the last time each cache entry was accessed by, generated by, and/or otherwise interacted with by resource group 118A (e.g., data included in Group A usage data 410). In this context, usage analyzer 704 analyzes obtained data 708 to determine the number of cache entries of set of cache entries 122A used by resource group 118A within the first period of time. In accordance with an embodiment, usage analyzer 704 obtains data 708 in response to an indication included in information 706 (e.g., an indication that a limit has been reached). In accordance with another embodiment, usage analyzer 704 obtains data 708 periodically.

In step 804, a total of the first set of cache entries used by the first group of computing nodes is determined. For example, usage analyzer 704 of FIG. 7 determines a total of set of cache entries 122A used by resource group 118A. In accordance with an embodiment, the total set of cache entries 122A is included in information 706 (and/or cache activeness signal 214). Alternatively, usage analyzer 704 obtains data from data storage 408 comprising a record of the total of set of cache entries 122A (e.g., data included in Group A usage data 410). Depending on the implementation, the data may be included in data 708 obtained in step 802 or obtained separately from data 708. In either case, usage analyzer 704 analyzes the obtained data to determine the total number of cache entries of set of cache entries 122A. In accordance with an embodiment, usage analyzer 704 obtains the data in response to an indication included in information 706 (e.g., an indication that a limit has been reached). In accordance with an embodiment, usage analyzer 704 obtains the data periodically.

In step 806, a ratio of the determined subset to the determined total of the first set of cache entries is determined to have a predetermined relationship with a threshold. For example, usage analyzer 704 determines a ratio of the subset of set of cache entries 122A determined in step 802 to the total of set of cache entries 122A determined in step 804. In this manner, usage analyzer 704 determines a ratio of "hot" cache entries to the entire set of cache entries used by resource group 118. In accordance with an embodiment, the ratio determined in step 806 is referred to as an "activeness ratio."

Flowchart 800 concludes with step 808. In accordance with an embodiment, step 808 is a further embodiment of steps 308 and 310, as described with respect to flowchart 300 of FIG. 3. In step 808, a cache entry of the first set of cache entries is reclaimed. For example, usage analyzer 704 determines to reclaim a cache entry of set of cache entries 122A based on the ratio determined in step 806 and provides indication 216 indicating the determined cache entry to reclamation task generator 208. In this context, reclamation task generator 208 generates reclamation task 218 to reclaim the determined cache entry.

Usage analyzer 704 may determine to reclaim the cache entry of set of cache entries 122A in various ways, in embodiments. For instance, as a non-limiting example, usage analyzer 704 determines the ratio determined in step 806 is below a predetermined threshold (i.e., the number of "hot" cache entries compared to the total set of cache entries is below a threshold), thus indicating that an "activeness" of the portion of cache memory 120 utilized by resource group 118A is low. The predetermined threshold may be a soft-limit threshold (e.g., wherein cold cache entries are gradually reclaimed), a hard-limit threshold (e.g., wherein a predetermined percentage or number of cache entries are reclaimed), or an inactive threshold (e.g., a threshold that, when the ratio determined in step 806 is at or below, indicates resource group 118A is inactive and all cache entries of set of cache entries 122A are to be reclaimed).

In accordance with one or more embodiments, usage analyzer 704 determines the number of cache entries of set of cache entries 122A to reclaim in various ways. For example, suppose set of cache entries 122A comprises a buffer pool and usage analyzer 704 determines that an activeness ratio of the buffer pool is below a predetermined threshold. In this example, usage analyzer 704 determines the number of pages in the buffer pool to reclaim $(\text{Pages}_{RECLAIM})$ according to the following equation:

$$\text{Pages}_{RECLAIM} = \text{MIN}\left(\frac{\text{Pages}_{TOTAL}}{2}, \text{Pages}_{TOTAL} - \text{Pages}_{ACTIVE}\right) \quad \text{Equation 2}$$

Where $\text{Pages}_{TOTAL}$ is the total number of pages in the buffer pool and $\text{Pages}_{ACTIVE}$ is the number of active pages in the buffer pool. In this context, usage analyzer 704 determines to reclaim up to half of $\text{Pages}_{TOTAL}$ if the activeness ratio is below a predetermined threshold. However, if the activeness ratio is below the threshold but $\text{Pages}_{ACTIVE}$ is greater than half of $\text{Pages}_{TOTAL}$, usage analyzer 704 determines to reclaim a number of pages equal to the difference of $\text{Pages}_{TOTAL}$ and $\text{Pages}_{ACTIVE}$. In this manner, usage analyzer 704 avoids reclaiming active pages utilized by resource group 118A.

Thus, an example process for reclaiming a cache entry based on usage of cache entries is described with respect to FIGS. 7 and 8. While flowchart 800 of FIG. 8 is described with respect to determining a set of hot cache entries and determining a ratio of hot cache entries to total cache entries of a set of cache entries, it is also contemplated herein that embodiments of usage analyzers may determine a set of "cold" cache entries (e.g., a subset of a set of cache entries that have not been accessed by a resource group within a first period of time). In this context, if a ratio of the number of cold cache entries to the total number of cache entries reaches a cold cache threshold (e.g., the number of cold cache entries is at or greater than the cold cache threshold), usage analyzer 704 determines to reclaim some or all of the cold cache entries. Furthermore, while flowchart 800 of FIG. 8 is described with respect usage analyzer 704 of resource monitor 114 determining the set of hot cache entries (and the ratio of hot cache entries to total cache entries), it is also contemplated herein that a cache broker (or a limit analyzer of a cache broker (e.g., limit analyzer 402 of FIG. 4)) in accordance with an alternative embodiment determines a set of hot (and/or cold) cache entries and/or determines a ratio of hot (and/or cold) cache entries to total cache entries of a set of cache entries.

Figure 9:
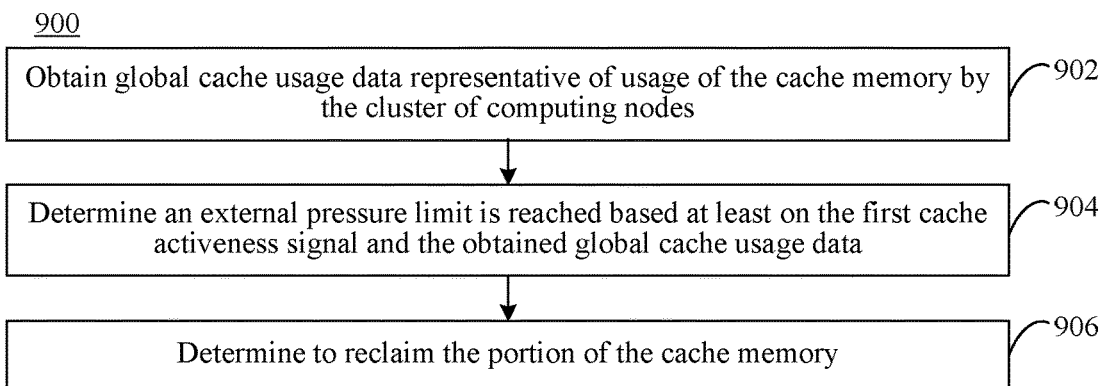
FIG. 9 shows a flowchart of a process for determining to reclaim the portion of the cache memory based on an external pressure limit, in accordance with an example embodiment.

As described with respect to FIG. 6, cache entries may be reclaimed based on external pressure. For instance, resource monitor 114 in accordance with an embodiment receives an indication from cache broker 116A (e.g., as cache activeness signal 214) that an external pressure limit is reached (e.g., as described with respect to FIG. 6). Alternatively, resource monitor 114 of FIG. 7 determines the external pressure limit is reached. Resource monitor 114 may determine the external pressure limit is reached in various ways, in embodiments. For example, FIG. 9 shows a flowchart 900 of a process for determining to reclaim the portion of the cache memory based on an external pressure limit, in accordance with an example embodiment. Resource monitor 114 of FIG. 7 may operate according to flowchart 900 in embodiments. Note that not all steps of flowchart 900 need be performed in all embodiments. Further structural and operation embodiments will be apparent to persons skilled in the relevant art(s) based on the following descriptions of FIGS. 7 and 9.

Flowchart 900 begins with step 902. In step 902, global cache usage data is obtained. The global cache usage data is representative of usage of the cache memory by the cluster of computing nodes. For example, usage analyzer 704 of FIG. 7 obtains data 708, data 708 includes global cache usage data 412 (or a portion thereof) representative of usage of cache memory 120 by cluster 110A. Depending on the implementation, usage analyzer 704 obtains data 708 in response to receiving information 706, obtains data 708 in response to activeness analyzer 206 receiving cache activeness signal 214, or periodically obtains data 708.

In step 904, a determination an external pressure limit is reached is made based at least on the first cache activeness signal and the obtained global cache usage data. For example, usage analyzer 704 of FIG. 7 determines if an external pressure limit is reached based at least on cache activeness signal 214 (or information 706 corresponding to cache activeness signal 214) and obtained data 708. For example, suppose the global cache data of data 708 indicates usage of cache memory 120 by cluster 110A is at or above a global cache usage threshold. In this context, usage analyzer 704 determines the external pressure limit is reached, and flowchart 900 continues to step 906.

As noted above, if the external pressure limit is reached, flowchart 900 continues to step 906. Step 906 is a further embodiment of step 308, as described with respect to flowchart 300 of FIG. 3. In step 906, a determination to reclaim the portion of the cache memory is made. For example, usage analyzer 704 of FIG. 7 determines to reclaim a portion of cache memory 120 (e.g., in response to the determination that the external pressure limit is reached made in step 906).

In accordance with an embodiment, usage analyzer 704 determines to reclaim (at least) a portion of set of cache entries 122A. For instance, suppose the external pressure limit of cache broker 116A is reached and usage analyzer 704 performs further analysis (as described elsewhere herein, e.g., with respect to FIG. 8) on the utilization of set of cache entries 122A by resource group 118A, identifies a number of "cold" cache entries in set of cache entries 122A, and determines to reclaim the identified cold cache entries.

In accordance with a further embodiment, usage analyzer 704 adjusts a limit threshold in response to the determination that the external pressure limit is reached. For instance, if the external pressure limit is reached, usage analyzer 704 in accordance with an embodiment decreases a cutoff threshold for determining that a cache entry is cold (in manner that would increase the number of cache entries identified as cold cache entries). In a non-limiting illustrative example, a cutoff threshold is set to "five hours" so that any cache entry of set of cache entries 122A not utilized by resource group 118A for five or more hours is considered "cold." In this example, in response to the external pressure limit being reached, usage analyzer 704 lowers the cutoff threshold to "three hours" so that any cache entry of set of cache entries 122A not utilized by resource group 118A for three or more hours is considered "cold." Furthermore, suppose the number of cache entries of set of cache entries 122A considered "cold" based on the adjusted cutoff threshold meets (or exceeds) a predetermined threshold. In this context, usage analyzer 704 determines to reclaim a portion of set of cache entries 122A based on the adjusted cutoff threshold. By adjust limits in this manner, usage analyzer 704 dynamically adjusts which cache entries are reclaimed in response to external memory pressure in a way that reduces the likelihood of reclaiming an "active" cache entry used by a resource group.

In accordance with another embodiment, usage analyzer 704 determines to reclaim a portion of a set of cache entries other than set of cache entries 122A (e.g., of set of cache entries 122N). For instance, suppose the external pressure limit of cache broker 116A is reached. In this first example, activeness analyzer 206 performs further analysis (as described elsewhere herein, e.g., with respect to FIG. 12) on utilization of set of cache entries 122N by resource group 118N, determines resource group 118N is a "bully" tenant, and determines to reclaim cache entries of sets of cache entries 122N.

In another alternative example where usage analyzer 704 determines to reclaim a portion of a set of cache entries other than set of cache entries 122A, suppose the external pressure limit of cache broker 116A is reached and usage analyzer 704 adjusts thresholds (e.g., soft limit thresholds, hard limit thresholds, cold cache thresholds, hot cache thresholds, and/or any other type of threshold used to determine if a cache entry for a resource group is to be reclaimed, as described elsewhere herein) for more than one resource group in cluster 110A (e.g., all resource groups). In this context, usage analyzer 704 receives and analyzes cache activeness signals from multiple cache brokers (e.g., as described with respect to FIG. 10 and elsewhere herein) and determines if a portion of cache memory 120 to be reclaimed. For example, further suppose the adjusted cutoff threshold for resource group 118N was lowered so that the number of cold cache entries in set of cache entries 122N was above a predetermined threshold. In this context, usage analyzer 704 determines to reclaim a portion of set of cache entries 122N (e.g., without determining to reclaim a cache entry from set of cache entries 122A). By adjusting limits for each resource group in a cluster, usage analyzer 704 dynamically adjusts which cache entries are reclaimed for an entire cluster in response to external memory pressure and selectively determines which set of cache entries to reclaim in a way that reduces the likelihood of reclaiming an "active" cache entry for one or more resource groups in the cluster.

In several examples, usage analyzer 704 is described as adjusting thresholds based on a determination that an external pressure limit is reached. In accordance with an embodiment, the adjusted thresholds are reset to their respective (previous or default) values subsequent to the external memory pressure falling below the external pressure limit threshold. Alternatively, the adjusted thresholds are reset subsequent to the external memory pressure falling below external pressure limit reset threshold that is lower than the external pressure limit threshold. In another alternative embodiment, the adjusted thresholds are reset in response to a reclamation task (e.g., reclamation task 218) generated by reclamation task generator 208.

As described herein, resource monitors may determine to reclaim a portion of cache memory in various ways. For instance, as noted above, a resource monitor may determine to reclaim a portion of cache memory based at least on respective cache activeness signals received from multiple cache brokers. Resource monitors may operate to determine to reclaim a portion of cache memory based at least on respective cache activeness signals in various ways, in embodiments. For example, FIG. 10 shows a block diagram of a system 1000 for reclaiming a portion of cache memory based on multiple cache activeness signals, in accordance with an example embodiment. As shown in FIG. 10, system 1000 includes cache broker 116A, cache broker 116N, and resource monitor 114 (comprising activeness analyzer 206 (comprising cache broker interface 702 and usage analyzer 704, as described with respect to FIG. 7) and reclamation task generator 208, as described with respect to FIG. 2), as each described with respect to FIG. 1.

For illustrative purposes, system 1000 of FIG. 10 is described with respect to FIG. 11. FIG. 11 shows a flowchart 1100 of a process for reclaiming a portion of cache memory based on multiple cache activeness signals, in accordance with an example embodiment. Resource monitor 114 of FIG. 10 may operate according to flowchart 1100. Note that not all steps of flowchart 1100 need be performed in all embodiments. Further structural and operation embodiments will be apparent to persons skilled in the relevant art(s) based on the following descriptions of FIGS. 10 and 11.

Flowchart 1100 begins with step 1102. In step 1102, a second cache activeness signal is received from a second cache broker. The second cache activeness signal is representative of a determined usage of the second set of cache entries by the second group of computing nodes. For example, cache broker interface 702 of FIG. 10 receives a cache activeness signal 1002, cache activeness signal 1002 representative of a determined usage of set of cache entries 122N by resource group 118N. In accordance with an embodiment, cache broker interface 702 updates a multi-bit "group mask" in response to cache activeness signal 1002 (e.g., in a manner similar to that described with respect to FIG. 7). Cache broker interface 702 in accordance with an embodiment updates usage data (e.g., global cache usage data 412 and/or resource group usage data for resource group 118N) based on cache activeness signal 1002. In accordance with an embodiment, and as shown in FIG. 7, cache broker interface 702 provides information 1004 to usage analyzer 704. Information 1004 in accordance with an embodiment includes usage information and/or indications included in cache activeness signal 214 (received from cache broker 116A, as described with respect to FIGS. 2, 3, and 7, as well as elsewhere herein) and cache activeness signal 1002. In accordance with another embodiment, information 1004 includes indications of changes in (or current status of) data tracked by cache broker interface 702 (e.g., changes in a multi-bit "group mask" of cache broker interface 702, not shown in FIG. 10).

Depending on the implementation, cache broker 702 may receive cache activeness signal 1002 simultaneous to, subsequent to, or irrespective to receiving cache activeness signal 214. For instance, in accordance with an embodiment, cache broker interface 702 queries cache brokers 116A and 116N (and/or other cache brokers of cluster 110A, not shown in FIG. 10) for activeness of respective sets of cache entries. In this context, cache broker interface 702 receives cache activeness signals 214 and 1002 (as well as any other cache activeness signals of other queried cache brokers not shown in FIG. 10) as the respective cache broker responds to the query. Cache broker interface 702 may query each cache broker individually or query the cache brokers simultaneously. In accordance with an embodiment, cache broker interface 702 periodically receives cache activeness signals from cache brokers 116A-116N.

Flowchart 1100 continues to step 1104. In accordance with an embodiment, step 1104 is a further embodiment of step 308, as described with respect to FIG. 3. In step 1104, a determination to reclaim a portion of the first set of cache entries or of the second set of cache entries is made based at least on the first cache activeness signal and the second cache activeness signal. For example, usage analyzer 704 of FIG. 10 receives information 1004 (corresponding to cache activeness signals 214 and 1002), determines to reclaim a portion of set of cache entries 122A or 122N based at least on the cache activeness signals, and provides indication 216 to reclamation task generator 208 indicating the determined portion of cache memory 120 to reclaim. Usage analyzer 704 may determine which portion of cache memory 120 to reclaim (e.g., which set of set cache entries 122A, set of cache entries 122N and/or other sets of cache entries of cache memory 120 not shown in FIG. 1 to reclaim one or more cache entries from) in various ways. For example, depending on the implementation usage analyzer 704 may determine which portion of set of cache entries 122A, set of cache entries 122N, and/or any other set of cache entries of cache memory 120 (not shown in FIG. 1) based at least on indications of a limit being reached included in a respective cache activeness signal, determination that a limit has been reached based on usage data included in a respective cache activeness signal, determination that a limit has been reached based on information tracked by cache broker interface 702, and/or any other by any other type of identification, determination, indication and/or the like suitable for determining whether a portion of cache memory 120 is to be reclaimed and, if so, which portion of cache memory 120 to reclaim described elsewhere herein, or as would be understood by a person ordinarily skilled in the relevant art(s) having benefit of this disclosure. In accordance with an embodiment, usage analyzer 704 determines to reclaim cache entries from some (but not all) sets of cache entries 116A-116N based at least on cache activeness signal 214 and cache activeness signal 1002. By analyzing multiple cache activeness signals in this way, usage analyzer 704 considers usage by each resource group monitored by the corresponding cache brokers in determining which cache entries to reclaim, thereby further improving the selection in the reclamation process while reducing negative impact on active cache entries of the resource groups.

As noted with respect to FIGS. 10 and 11, resource monitor 114 of FIG. 10 receives respective cache activeness signals from cache brokers 116A and 116N and determines to reclaim a portion of cache memory based at least on the respective cache activeness signals. Resource monitor 114 may make this determination and reclaim the portion of cache memory in various ways, in embodiments. For example, FIG. 12 shows a flowchart 1200 of a process for reclaiming a cache entry from a second set of cache entries, in accordance with an example embodiment. Resource monitor of FIG. 10 may operate according to flowchart 1200. Note that not all steps of flowchart 1200 need be performed in all embodiments. Further structural and operation embodiments will be apparent to persons skilled in the relevant art(s) based on the following descriptions of FIGS. 10 and 12.

Flowchart 1200 begins with step 1202. In accordance with an embodiment, step 1202 is a further embodiment of step 1104 of flowchart 1100, as described with respect to FIG. 11. In step 1202, a total of the second set of cache entries used by the second group of computing nodes is determined to have a predetermined relationship with a threshold. For example, usage analyzer 704 of FIG. 10 determines a total of set of cache entries 122N used by resource group 118N has a predetermined relationship with a threshold. For instance, suppose usage analyzer 704 determines the total number of cache entries (or the total size in memory) of set of cache entries 122N is above a "bully threshold" of resource monitor 114. In this context, usage analyzer 704 determines that resource group 118N is using a relatively large portion of cache memory 120 compared to other resource groups of cluster 110A (e.g., resource group 118A). Depending on the implementation, the bully threshold may be static or may dynamically change based on the number of resource groups in cluster 110A, the number of users with resource groups 110A, and/or other policies of resource groups and/or service providers associated with cluster 110A. In accordance with an embodiment, two or more resource groups have different corresponding bully thresholds. For instance, the bully threshold for a resource group may be proportionate to the number of users (or user accounts) in the resource group (e.g., a resource group with a particular number of users has a larger bully threshold than a resource group with a fewer number of users). As another example, a cloud service provider may determine different bully thresholds based on reclamation policies for a particular resource group (e.g., a subscription of a tenant of a first resource group enables the resource group to utilize a larger portion of cache memory 120 if available).

Flowchart 1200 continues to step 1204. In accordance with an embodiment, step 1204 is a further embodiment of step 310 of flowchart 300, as described with respect to FIG. 3. In step 1204, a cache entry of the second set of cache entries is reclaimed. For example, usage analyzer 704 determines to reclaim one or more cache entries of sets of cache entries 118N based on the determination made in step 1202 and provides indication 216 to reclamation task generator 208 indicating one or more cache entries of sets of cache entries 118N are to be reclaimed. Reclamation task generator 208 generates reclamation task 218, and the one or more cache entries of sets of cache entries 118N are reclaimed.

V. Additional Embodiments

A. Reclaiming Cache Entries at Other Granularities

Several example embodiments have been described herein as determining sets of cache entries to reclaim based on usage of cache memory by a resource group; however, it is also contemplated herein that sets of cache entries may be reclaimed based on usage of cache memory at other granularities of resource groups and/or nodes in a cluster of computing nodes of a cloud service platform. For instance, in accordance with one or more embodiments, a resource monitor determines to reclaim cache entries associated with a subset of nodes of a resource groups (e.g., node(s) associated with a particular user or users of a group of users associated with the resource group, node(s) associated with a particular application or applications of a group of applications associated with the resource group, node(s) associated with a particular user account or user accounts of a group of user accounts (e.g., of the same user, of a group of users, of an organization, etc.) associated with the resource group, and/or the like).

For example, as described elsewhere herein, cache entries are associated with a resource group by associating each cache entry with a group ID of the resource group. It is also contemplated herein that cache entries may be associated with other identifiers (e.g., user IDs, user group IDs, user account IDs, application IDs, service principal IDs, cluster IDs, tenant IDs, etc.). In this context, cache brokers may generate cache activeness signals for a particular identifier or set of identifiers and resource monitors may determine to reclaim portions of cache memory based on the generated cache activeness signals using techniques similar to those described elsewhere herein with respect to reclaiming cache entries based on group IDs associated with the cache entries.

B. Sampling-Based Cache Usage Determination

Several example embodiments have been described herein as generating cache activeness signals based on determined usage of a set of cache entries by a resource group. For instance, a cache quota controller of a cache broker monitors cache entries used by a resource group and determines usage of the cache entries by the resource group. It is also contemplated herein that a cache broker (or a component thereof, such as a cache quota controller) may determine the usage of a set of cache entries using a sampling-based algorithm. For instance, a cache quota controller (e.g., cache quota controller 202 of FIG. 2) samples usage of a subset of a set of cache entries associated with a resource group. As a non-limiting example and with reference again to FIG. 2, suppose cache quota controller 202 obtains information 210 by sampling a subset of set of cache entries 122A. In this context, cache quota controller 202 determines usage for set of cache entries 122A based on the sampled subset (i.e., wherein the determined usage is representative of usage for set of cache entries 122A) to generate usage signal 212. Cache activeness manager 204 generates cache activeness signal 214 based on usage signal 212, as described elsewhere herein. In accordance with an embodiment, cache activeness signal 214 includes an indication that it is generated based on a sample of set of cache entries 122A.

As described above, cache quota controller 202 may determine usage based on a sampled subset of set of cache entries 122A. The subset may be a fixed sample size or a dynamic sample size (e.g., a sample size based on a job cap of resource group 118A or cluster 110A, a total number of active users in resource group 118A, a total number of resource groups in cluster 110A, and/or any other adjustable sample size). For instance, a cache quota controller of a high-density cluster may sample more cache entries than a cache quota controller of a low-density cluster. In this context, an activeness ratio for resource group 118A is determined based on a ratio of active cache entries in the sampled subset to the total number of entries in the sampled subset.

In accordance with one or more embodiments, cache broker 116A (or a component thereof, such as, but not limited to, cache activeness manager 204) and/or resource monitor 114 (or a component thereof, such as, but not limited to, activeness analyzer 206) determines whether the activeness ratio for the sampled subset is below a sampling threshold (or the number of active cache entries in the sampled subset is below a sampling threshold). In accordance with a further embodiment, if the activeness ratio is below the sampling threshold, reclamation for the resource group is skipped. In accordance with an alternative further embodiment, cache quota controller 202 re-samples set of cache entries 122A with a larger sampling size and determines usage based on the re-sampled subset. Depending on the implementation, cache quota controller 202 may re-sample a predetermined number of times (increasing the sampling size each time) or re-sample until the activeness ratio is at or above the sampling threshold. In accordance with an embodiment, if the activeness ratio is below the sampling threshold, cache broker 116A or resource monitor 114 transmits a notification to an administrator or developer of cache broker 116A. The notification may include an indication that the sampling algorithm of cache quota controller 202 needs to be recalibrated, the number of times cache quota controller 202 re-sampled set of cache entries 122A, the sampling size(s) of sample(s) obtained by cache quota controller 202, and/or any other information associated with cache memory 120, cache broker 116A, resource group 118A, resource monitor 114, and/or cluster 110A.

VI. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 13:
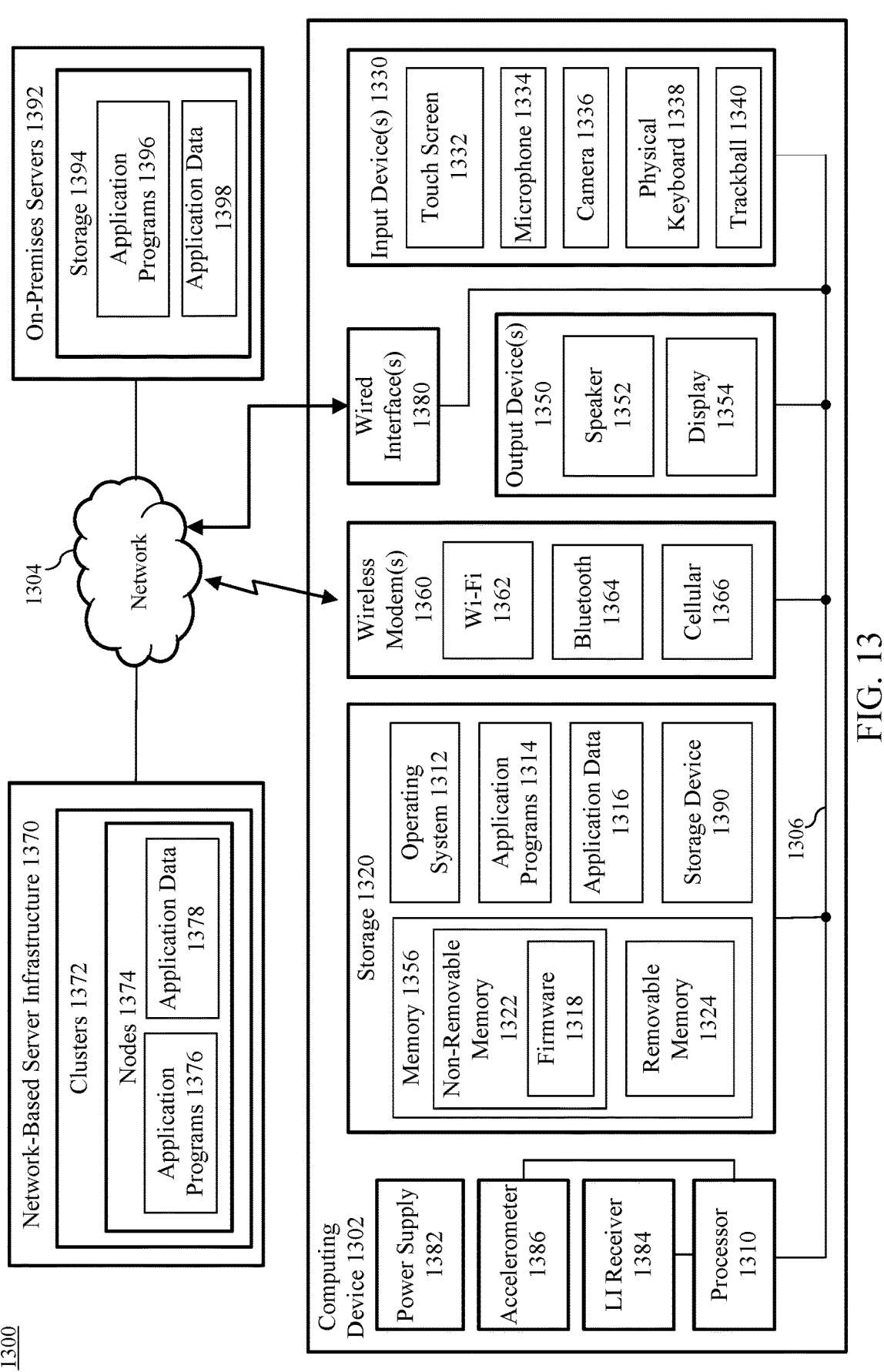
FIG. 13 shows a block diagram of an example computing system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 13. FIG. 13 shows a block diagram of an exemplary computing environment 1300 that includes a computing device 1302. Computing device 1302 is an example of user computing device 102A, user computing device 102N, admin computing device 106, and/or server infrastructure 104 (or a component thereof) of FIG. 1, each of which may include one or more of the components of computing device 1302. In some embodiments, computing device 1302 is communicatively coupled with devices (not shown in FIG. 13) external to computing environment 1300 via network 1304. Network 1304 is an example of network 108 of FIG. 1, and comprises one or more networks such as local area networks (LANs), wide area networks (WANs), enterprise networks, the Internet, etc., and may include one or more wired and/or wireless portions. Network 1304 may additionally or alternatively include a cellular network for cellular communications. Computing device 1302 is described in detail as follows Computing device 1302 can be any of a variety of types of computing devices. For example, computing device 1302 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1302 may alternatively be a stationary computing device such as a desktop computer, a personal computer (PC), a stationary server device, a minicomputer, a mainframe, a supercomputer, etc.

As shown in FIG. 13, computing device 1302 includes a variety of hardware and software components, including a processor 1310, a storage 1320, one or more input devices 1330, one or more output devices 1350, one or more wireless modems 1360, one or more wired interfaces 1380, a power supply 1382, a location information (LI) receiver 1384, and an accelerometer 1386. Storage 1320 includes memory 1356, which includes non-removable memory 1322 and removable memory 1324, and a storage device 1390. Storage 1320 also stores an operating system 1312, application programs 1314, and application data 1316. Wireless modem(s) 1360 include a Wi-Fi modem 1362, a Bluetooth modem 1364, and a cellular modem 1366. Output device(s) 1350 includes a speaker 1352 and a display 1354. Input device(s) 1330 includes a touch screen 1332, a microphone 1334, a camera 1336, a physical keyboard 1338, and a trackball 1340. Not all components of computing device 1302 shown in FIG. 13 are present in all embodiments, additional components not shown may be present, and any combination of the components may be present in a particular embodiment. These components of computing device 1302 are described as follows.

A single processor 1310 (e.g., central processing unit (CPU), microcontroller, a microprocessor, signal processor, ASIC (application specific integrated circuit), and/or other physical hardware processor circuit) or multiple processors 1310 may be present in computing device 1002 for performing such tasks as program execution, signal coding, data processing, input/output processing, power control, and/or other functions. Processor 1310 may be a single-core or multi-core processor, and each processor core may be single-threaded or multithreaded (to provide multiple threads of execution concurrently). Processor 1310 is configured to execute program code stored in a computer readable medium, such as program code of operating system 1312 and application programs 1314 stored in storage 1320. Operating system 1312 controls the allocation and usage of the components of computing device 1302 and provides support for one or more application programs 1314 (also referred to as "applications" or "apps"). Application programs 1314 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1302 can communicate with any other component according to function, although not all connections are shown for ease of illustration. For instance, as shown in FIG. 13, bus 1306 is a multiple signal line communication medium (e.g., conductive traces in silicon, metal traces along a motherboard, wires, etc.) that may be present to communicatively couple processor 1310 to various other components of computing device 1302, although in other embodiments, an alternative bus, further buses, and/or one or more individual signal lines may be present to communicatively couple components. Bus 1306 represents one or more of any of several types of bus structures, including a memory bus or memory controller, a peripheral bus, an accelerated graphics port, and a processor or local bus using any of a variety of bus architectures.

Storage 1320 is physical storage that includes one or both of memory 1356 and storage device 1390, which store operating system 1312, application programs 1314, and application data 1316 according to any distribution. Non-removable memory 1322 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1322 may include main memory and may be separate from or fabricated in a same integrated circuit as processor 1310. As shown in FIG. 13, non-removable memory 1322 stores firmware 1318, which may be present to provide low-level control of hardware. Examples of firmware 1318 include BIOS (Basic Input/Output System, such as on personal computers) and boot firmware (e.g., on smart phones). Removable memory 1324 may be inserted into a receptacle of or otherwise coupled to computing device 1302 and can be removed by a user from computing device 1302. Removable memory 1324 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1390 may be present that are internal and/or external to a housing of computing device 1302 and may or may not be removable. Examples of storage device 1390 include a hard disk drive, a SSD, a thumb drive (e.g., a USB (Universal Serial Bus) flash drive), or other physical storage device.

One or more programs may be stored in storage 1320. Such programs include operating system 1312, one or more application programs 1314, and other program modules and program data. Examples of such application programs may include, for example, computer program logic (e.g., computer program code/instructions) for implementing one or more of resource monitor 114, cache broker 116A, cache broker 116N, computing node(s) 118A, computing node(s) 118N, cache memory 120, cache quota controller 202, cache activeness manager 204, activeness analyzer 206, reclamation task generator 208, limit analyzer 402, usage updater 404, activeness signal generator 406, cache broker interface 702, and/or usage analyzer 704, along with any components and/or subcomponents thereof, as well as the flowcharts/ flow diagrams (e.g., flowcharts 300, 500, 600, 800, 900, 1100, and/or 1200) described herein, including portions thereof, and/or further examples described herein.

Storage 1320 also stores data used and/or generated by operating system 1312 and application programs 1314 as application data 1316. Examples of application data 1316 include web pages, text, images, tables, sound files, video data, and other data, which may also be sent to and/or received from one or more network servers or other devices via one or more wired or wireless networks. Storage 1320 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1302 through one or more input devices 1330 and may receive information from computing device 1002 through one or more output devices 1350. Input device(s) 1330 may include one or more of touch screen 1332, microphone 1334, camera 1336, physical keyboard 1338 and/or trackball 1340 and output device(s) 1350 may include one or more of speaker 1352 and display 1354. Each of input device(s) 1330 and output device(s) 1350 may be integral to computing device 1302 (e.g., built into a housing of computing device 1302) or external to computing device 1302 (e.g., communicatively coupled wired or wirelessly to computing device 1302 via wired interface(s) 1380 and/or wireless modem(s) 1360). Further input devices 1330 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1354 may display information, as well as operating as touch screen 1332 by receiving user commands and/or other information (e.g., by touch, finger gestures, virtual keyboard, etc.) as a user interface. Any number of each type of input device(s) 1330 and output device(s) 1350 may be present, including multiple microphones 1334, multiple cameras 1336, multiple speakers 1352, and/or multiple displays 1354.

One or more wireless modems 1360 can be coupled to antenna(s) (not shown) of computing device 1302 and can support two-way communications between processor 1310 and devices external to computing device 1302 through network 1304, as would be understood to persons skilled in the relevant art(s). Wireless modem 1360 is shown generically and can include a cellular modem 1366 for communicating with one or more cellular networks, such as a GSM network for data and voice communications within a single cellular network, between cellular networks, or between the mobile device and a public switched telephone network (PSTN). Wireless modem 1360 may also or alternatively include other radio-based modem types, such as a Bluetooth modem 1364 (also referred to as a "Bluetooth device") and/or Wi-Fi 1062 modem (also referred to as an "wireless adaptor"). Wi-Fi modem 1362 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1302 can further include power supply 1382, LI receiver 1384, accelerometer 1386, and/or one or more wired interfaces 1380. Example wired interfaces 1380 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1380 of computing device 1302 provide for wired connections between computing device 1302 and network 1304, or between computing device 1302 and one or more devices/ peripherals when such devices/peripherals are external to computing device 1302 (e.g., a pointing device, display 1354, speaker 1352, camera 1336, physical keyboard 1338, etc.). Power supply 1382 is configured to supply power to each of the components of computing device 1302 and may receive power from a battery internal to computing device 1302, and/or from a power cord plugged into a power port of computing device 1302 (e.g., a USB port, an A/C power port). LI receiver 1384 may be used for location determination of computing device 1302 and may include a satellite navigation receiver such as a Global Positioning System (GPS) receiver or may include other type of location determiner configured to determine location of computing device 1302 based on received information (e.g., using cell tower triangulation, etc.). Accelerometer 1086 may be present to determine an orientation of computing device 1302.

Note that the illustrated components of computing device 1302 are not required or all-inclusive, and fewer or greater numbers of components may be present as would be recognized by one skilled in the art. For example, computing device 1302 may also include one or more of a gyroscope, barometer, proximity sensor, ambient light sensor, digital compass, etc. Processor 1310 and memory 1356 may be co-located in a same semiconductor device package, such as being included together in an integrated circuit chip, FPGA, or system-on-chip (SOC), optionally along with further components of computing device 1302.

In embodiments, computing device 1302 is configured to implement any of the above-described features of flowcharts herein. Computer program logic for performing any of the operations, steps, and/or functions described herein may be stored in storage 1320 and executed by processor 1310.

In some embodiments, server infrastructure 1370 may be present in computing environment 1300 and may be communicatively coupled with computing device 1302 via network 1304. Server infrastructure 1370, when present, may be a network-accessible server set (e.g., a cloud computing platform). As shown in FIG. 13, server infrastructure 1370 includes clusters 1372. Each of clusters 1372 may comprise a group of one or more compute nodes and/or a group of one or more storage nodes. For example, as shown in FIG. 13, cluster 1372 includes nodes 1374. Each of nodes 1374 are accessible via network 1304 (e.g., in a "cloud computing platform" or "cloud-based" embodiment) to build, deploy, and manage applications and services. Any of nodes 1374 may be a storage node that comprises a plurality of physical storage disks, SSDs, and/or other physical storage devices that are accessible via network 1304 and are configured to store data associated with the applications and services managed by nodes 1074. For example, as shown in FIG. 13, nodes 1374 may store application data 1378.

Each of nodes 1374 may, as a compute node, comprise one or more server computers, server systems, and/or computing devices. For instance, a node 1374 may include one or more of the components of computing device 1302 disclosed herein. Each of nodes 1374 may be configured to execute one or more software applications (or "applications") and/or services and/or manage hardware resources (e.g., processors, memory, etc.), which may be utilized by users (e.g., customers) of the network-accessible server set. For example, as shown in FIG. 13, nodes 1374 may operate application programs 1376. In an implementation, a node of nodes 1374 may operate or comprise one or more virtual machines, with each virtual machine emulating a system architecture (e.g., an operating system), in an isolated manner, upon which applications such as application programs 1376 may be executed.

In an embodiment, one or more of clusters 1372 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1372 may be a datacenter in a distributed collection of datacenters. In embodiments, exemplary computing environment 1300 comprises part of a cloud-based platform such as Amazon Web Services® of Amazon Web Services, Inc. or Google Cloud Platform™ of Google LLC, although these are only examples and are not intended to be limiting.

In an embodiment, computing device 1302 may access application programs 1376 for execution in any manner, such as by a client application and/or a browser at computing device 1302. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1302 may additionally and/or alternatively synchronize copies of application programs 1314 and/or application data 1316 to be stored at network-based server infrastructure 1370 as application programs 1376 and/or application data 1378. For instance, operating system 1312 and/or application programs 1314 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1320 at network-based server infrastructure 1370.

In some embodiments, on-premises servers 1392 may be present in computing environment 1300 and may be communicatively coupled with computing device 1302 via network 1304. On-premises servers 1392, when present, are hosted within an organization's infrastructure and, in many cases, physically onsite of a facility of that organization. On-premises servers 1392 are controlled, administered, and maintained by IT (Information Technology) personnel of the organization or an IT partner to the organization. Application data 1398 may be shared by on-premises servers 1392 between computing devices of the organization, including computing device 1302 (when part of an organization) through a local network of the organization, and/or through further networks accessible to the organization (including the Internet). Furthermore, on-premises servers 1392 may serve applications such as application programs 1396 to the computing devices of the organization, including computing device 1302. Accordingly, on-premises servers 1392 may include storage 1394 (which includes one or more physical storage devices such as storage disks and/or SSDs) for storage of application programs 1096 and application data 1398 and may include one or more processors for execution of application programs 1396. Still further, computing device 1302 may be configured to synchronize copies of application programs 1314 and/or application data 1316 for backup storage at on-premises servers 1392 as application programs 1396 and/or application data 1398.

Embodiments described herein may be implemented in one or more of computing device 1302, network-based server infrastructure 1370, and on-premises servers 1392. For example, in some embodiments, computing device 1302 may be used to implement systems, clients, or devices, or components/subcomponents thereof, disclosed elsewhere herein. In other embodiments, a combination of computing device 1302, network-based server infrastructure 1370, and/or on-premises servers 1392 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1320. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1314) may be stored in storage 1320. Such computer programs may also be received via wired interface(s) 1380 and/or wireless modem(s) 1360 over network 1304. Such computer programs, when executed or loaded by an application, enable computing device 1302 to implement features of embodiments discussed herein. Accordingly, such computer programs represent controllers of the computing device 1302.

Embodiments are also directed to computer program products comprising computer code or instructions stored on any computer-readable medium or computer-readable storage medium. Such computer program products include the physical storage of storage 1320 as well as further physical storage types.

VII. Additional Exemplary Embodiments

A system in a cloud computing environment is disclosed herein. The system comprises a cluster of computing nodes, a cache memory, a first cache broker, and a resource monitor. The cluster of computing nodes comprises a first group of computing nodes and a second group of computing nodes. The cache memory comprises a first set of cache entries utilized by the first group of computing nodes and a second set of cache entries utilized by the second group of computing nodes. The first cache broker determines a usage of the first set of cache entries by the first group of computing nodes and generates a first cache activeness signal representative of the determined usage of the first set of cache entries. The resource monitor receives the first cache activeness signal, determines to reclaim a portion of the first set of cache entries or of the second set of cache entries based at least on the first cache activeness signal, and reclaims the determined portion of the cache memory.

In one implementation of the forgoing system, the resource monitor determines to reclaim the portion of the first set of cache entries or of the second set of cache entries by: determining a subset of the first set of cache entries accessed by the first group of computing nodes within a first period of time, determining a total of the first set of cache entries used by the first group of computing nodes, and determining a ratio of the determined subset to the determined total of the first set of cache entries has a predetermined relationship with a threshold. The resource monitor reclaims the portion of the cache memory by reclaiming a cache entry of the first set of cache entries.

In one implementation of the forgoing system, the cache broker determines the usage of the first set of cache entries by: determining a subset of the first set of cache entries accessed by the first group of computing nodes within a first period of time, determining a total of the first set of cache entries used by the first group of computing nodes, and determining a ratio of the determined subset to the determined total of the first set of cache entries has a predetermined relationship with a threshold.

In one implementation of the forgoing system, the cache memory comprises at least one of: an internal cache memory of the first group of computing nodes; a buffer pool; or a column store.

In one implementation of the forgoing system, the first cache broker generates the first cache activeness signal by: determining that a soft limit is reached based at least on the determined usage of the first set of cache entries, and generating the first cache activeness signal to include an indication that the soft limit is reached. The resource monitor determines to reclaim a subset of the first set of cache entries based at least on the indication that the soft limit is reached.

In one implementation of the forgoing system, the resource monitor: receives a second cache activeness signal from a second cache broker, the second cache activeness signal representative of a determined usage of the second set of cache entries by the second group of computing nodes; and determines to reclaim a portion of the first set of cache entries or of the second set of cache entries based at least on the first cache activeness signal and the second cache activeness signal.

In one implementation of the forgoing system, the resource monitor determines to reclaim the portion of the cache memory by determining a total of the second set of cache entries used by the second group of computing nodes has a predetermined relationship with a threshold. The resource monitor reclaims the portion of the cache memory by reclaiming a cache entry of the second set of cache entries.

In one implementation of the forgoing system, the first cache broker generates the first cache activity signal by: determining that an external pressure limit is reached based at least on the determined usage of the first set of cache entries and global cache usage data, the global cache usage data representative of usage of the cache memory by the cluster of computing nodes; and generating the first cache activeness signal to include an indication that the external pressure limit is reached.

In one implementation of the forgoing system, the first group of computing nodes comprises at least one of: a computing node associated with a user; a plurality of computing nodes associated with a group of users; or a plurality of computing nodes associated with a tenant.

A method for reclaiming a portion of a cache memory in a cloud computing environment is also disclosed herein. The method comprises: receiving a first cache activeness signal from a first cache broker, the first cache activeness signal representative of a usage of a first set of cache entries of the cache memory by a first group of computing nodes in a cluster of computing nodes; determining to reclaim a portion of the first set of cache entries or of a second set of cache entries based at least on the first cache activeness signal, the second set of cache entries utilized by a second group of computing nodes in the cluster of computing nodes; and reclaiming the determined portion of the cache memory.

In one implementation of the foregoing method, said determining to reclaim the portion of the cache memory comprises: determining a subset of the first set of cache entries accessed by the first group of computing nodes within a first period of time, determining a total of the first set of cache entries used by the first group of computing nodes, and determining a ratio of the determined subset to the determined total of the first set of cache entries has a predetermined relationship with a threshold; and said reclaiming the determined portion of the cache memory comprises: reclaiming a cache entry of the first set of cache entries.

In one implementation of the foregoing method, the first cache activeness signal comprises an indication that a soft limit is reached; and said determining to reclaim the portion of the cache memory comprises: determining to reclaim a subset of the first set of cache entries based at least on the indication that the soft limit is reached.

In one implementation of the foregoing method, the method further comprises: receiving a second cache activeness signal from a second cache broker, the second cache activeness signal representative of a determined usage of the second set of cache entries by the second group of computing nodes; and said determining to reclaim the portion of the cache memory comprises: determining to reclaim the portion of the cache memory based at least on the first cache activeness signal and the second cache activeness signal.

In one implementation of the foregoing method, said determining to reclaim the portion of the cache memory comprises: determining a total of the second set of cache entries used by the second group of computing nodes has a predetermined relationship with a threshold; and said reclaiming the portion of the cache memory comprises: reclaiming a cache entry of the second set of cache entries.

In one implementation of the foregoing method, said determining to reclaim the portion of the cache memory comprises: obtaining global cache usage data representative of usage of the cache memory by the cluster of computing nodes; determining that an external pressure limit is reached based at least on the first cache activeness signal and the obtained global cache usage data; and determining to reclaim the portion of the cache memory.

In one implementation of the forgoing method, the first group of computing nodes comprises at least one of: a computing node associated with a user; a plurality of computing nodes associated with a group of users; or a plurality of computing nodes associated with a tenant.

In one implementation of the foregoing method, the cache memory comprises at least one of: an internal cache memory of the first group of computing nodes; a buffer pool; or a column store.

A resource monitoring system coupled to a cluster of computing nodes in a cloud computing environment is described herein. The resource monitoring system comprises a processor circuit and a memory. The memory stores program code executable by the processor circuit to perform operations for reclaiming a portion of a cache memory in the cloud computing environment. The operations comprise: receiving a first cache activeness signal from a first cache broker, the first cache activeness signal representative of a usage of a first set of cache entries of the cache memory by a first group of computing nodes in the cluster of computing nodes; determining to reclaim a portion of the first set of cache entries or of a second set of cache entries based at least on the first cache activeness signal, the second set of cache entries utilized by a second group of computing nodes in the cluster of computing nodes; and reclaiming the determined portion of the cache memory.

In one implementation of the foregoing resource monitoring system, said determining to reclaim the portion of the cache memory comprises: determining a subset of the first set of cache entries accessed by the first group of computing nodes within a first period of time, determining a total of the first set of cache entries used by the first group of computing nodes, and determining a ratio of the determined subset to the determined total of the first set of cache entries has a predetermined relationship with a threshold; and said reclaiming the determined portion of the cache memory comprises: reclaiming a cache entry of the first set of cache entries.

In one implementation of the foregoing resource monitoring system, the first cache activeness signal comprises an indication that a soft limit is reached; and said determining to reclaim the portion of the cache memory comprises: determining to reclaim a subset of the first set of cache entries based at least on the indication that the soft limit is reached.

In one implementation of the foregoing resource monitoring system, the operations further comprise: receiving a second cache activeness signal from a second cache broker, the second cache activeness signal representative of a determined usage of the second set of cache entries by the second group of computing nodes; and said determining to reclaim the portion of the cache memory comprises: determining to reclaim the portion of the cache memory based at least on the first cache activeness signal and the second cache activeness signal.

In one implementation of the foregoing resource monitoring system, said determining to reclaim the portion of the cache memory comprises: determining a total of the second set of cache entries used by the second group of computing nodes has a predetermined relationship with a threshold; and said reclaiming the portion of the cache memory comprises: reclaiming a cache entry of the second set of cache entries.

In one implementation of the foregoing resource monitoring system, said determining to reclaim the portion of the cache memory comprises: obtaining global cache usage data representative of usage of the cache memory by the cluster of computing nodes; determining that an external pressure limit is reached based at least on the first cache activeness signal and the obtained global cache usage data; and determining to reclaim the portion of the cache memory.

In one implementation of the forgoing resource monitoring system, the first group of computing nodes comprises at least one of: a computing node associated with a user; a plurality of computing nodes associated with a group of users; or a plurality of computing nodes associated with a tenant.

In one implementation of the foregoing resource monitoring system, the cache memory comprises at least one of: an internal cache memory of the first group of computing nodes; a buffer pool; or a column store.

In one implementation of the foregoing resource monitoring system, the resource monitoring system comprises the first cache broker.

A cache broker coupled to a first set of cache entries of a cache memory in a cloud computing environment is described herein. The first set of cache entries utilized by a first group of computing nodes in a cluster of computing nodes of the cloud computing environment. The cache broker comprises a processor circuit and a memory. The memory stores program code executable by the processor circuit to perform operations for determining activeness of the first set of cache entries. The operations comprise: determining a usage of the first set of cache entries by the first group of computing nodes; and generating a cache activeness signal representative of the determined usage of the first set of cache entries.

In one implementation of the foregoing cache broker, the operations further comprise transmitting the cache active- ness signal to a resource monitor coupled to the cluster of computing nodes.

In one implementation of the foregoing cache broker, said determining the usage of the first set of cache entries comprises: determining a subset of the first set of cache entries accessed by the first group of computing nodes within a first period of time, determining a total of the first set of cache entries used by the first group of computing nodes, and determining a ratio of the determined subset to the determined total of the first set of cache entries has a predetermined relationship with a threshold.

In one implementation of the forgoing cache broker, the cache memory comprises at least one of: an internal cache memory of the first group of computing nodes; a buffer pool; or a column store.

In one implementation of the forgoing cache broker, said generating the cache activeness signal comprises: determin- ing that a soft limit is reached based at least on the determined usage of the first set of cache entries, and generating the cache activeness signal to include an indica- tion that the soft limit is reached.

In one implementation of the forgoing cache broker, said generating the cache activity signal comprises: determining that an external pressure limit is reached based at least on the determined usage of the first set of cache entries and global cache usage data, the global cache usage data representative of usage of the cache memory by the cluster of computing nodes; and generating the cache activeness signal to include an indication that the external pressure limit is reached.

In one implementation of the forgoing cache broker, the first group of computing nodes comprises at least one of: a computing node associated with a user; a plurality of com- puting nodes associated with a group of users; or a plurality of computing nodes associated with a tenant.

A method for determining activeness of a first set of cache entries of a cache memory in a cloud computing environ- ment is described herein. The method comprises: determin- ing a usage of the first set of cache entries by a first group of computing nodes in a cluster of computing nodes of the cloud computing environment; and generating a cache activeness signal representative of the determined usage of the first set of cache entries.

In one implementation of the foregoing method, the method further comprises transmitting the cache activeness signal to a resource monitor coupled to the cluster of computing nodes.

In one implementation of the foregoing method, said determining the usage of the first set of cache entries comprises: determining a subset of the first set of cache entries accessed by the first group of computing nodes within a first period of time, determining a total of the first set of cache entries used by the first group of computing nodes, and determining a ratio of the determined subset to the determined total of the first set of cache entries has a predetermined relationship with a threshold.

In one implementation of the forgoing method, the cache memory comprises at least one of: an internal cache memory of the first group of computing nodes; a buffer pool; or a column store.

In one implementation of the forgoing method, said generating the cache activeness signal comprises: determin- ing that a soft limit is reached based at least on the determined usage of the first set of cache entries, and generating the cache activeness signal to include an indica- tion that the soft limit is reached.

In one implementation of the forgoing method, said generating the cache activity signal comprises: determining that an external pressure limit is reached based at least on the determined usage of the first set of cache entries and global cache usage data, the global cache usage data representative of usage of the cache memory by the cluster of computing nodes; and generating the cache activeness signal to include an indication that the external pressure limit is reached.

In one implementation of the forgoing method, the first group of computing nodes comprises at least one of: a computing node associated with a user; a plurality of com- puting nodes associated with a group of users; or a plurality of computing nodes associated with a tenant.

A computer-readable storage medium having program instructions recorded thereon is also described herein. The program instructions are executable by a processor circuit to perform operations of any of the foregoing methods.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or char- acteristic. Moreover, such phrases are not necessarily refer- ring to the same embodiment. Further, when a particular feature, structure, or characteristic is described in connection with an embodiment, it is submitted that it is within the knowledge of one skilled in the art to affect such feature, structure, or characteristic in connection with other embodi- ments whether or not explicitly described.

In the discussion, unless otherwise stated, adjectives modifying a condition or relationship characteristic of a feature or features of an implementation of the disclosure, should be understood to mean that the condition or charac- teristic is defined to within tolerances that are acceptable for operation of the implementation for an application for which it is intended. Furthermore, if the performance of an opera- tion is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsec- tion in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, reclamation systems, resource monitors, cache brokers, computing nodes, cache memories, clusters, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system in a cloud computing environment, comprising:
    a cluster of computing nodes comprising a first group of computing nodes and a second group of computing nodes;
    a cache memory comprising a first set of cache entries utilized by the first group of computing nodes and a second set of cache entries utilized by the second group of computing nodes;
    a processor circuit that:
        determines a sample size of the first group of computing nodes based on a number of active users associated with the first group of computing nodes,
        samples the first set of cache entries based on the determined sample size,
        determines a usage of the sampled cache entries by the first group of computing nodes,
        determines a first cache activeness signal representative of the determined usage of the sampled cache entries,
        determines to reclaim a portion of the first set of cache entries or of the second set of cache entries based at least on the first cache activeness signal, and
        reclaims the determined portion of the cache memory.

2. The system of claim 1, wherein the processor circuit:
    determines to reclaim the portion of the first set of cache entries or of the second set of cache entries by:
        determining a subset of the sampled cache entries accessed by the first group of computing nodes within a first period of time,
        determining a total of the sampled cache entries used by the first group of computing nodes, and
        determining a ratio of the determined subset to the determined total of the sampled cache entries has a predetermined relationship with a threshold; and
    reclaims the portion of the cache memory by:
        reclaiming a cache entry of the first set of cache entries.

3. The system of claim 1, wherein the cache memory comprises at least one of:
    an internal cache memory of the first group of computing nodes;
    a buffer pool; or
    a column store.

4. The system of claim 1, wherein the processor circuit generates the first cache activeness signal by:
    determining that a first limit is reached based at least on the determined usage of the first set of cache entries, and
    generating the first cache activeness signal to include an indication that the first limit is reached; and
    the resource monitor determines to reclaim a subset of the first set of cache entries based at least on the indication that the first limit is reached.

5. The system of claim 1, wherein the processor circuit further:
    determines to reclaim a portion of the first set of cache entries or of the second set of cache entries based at least on the first cache activeness signal and a second cache activeness signal, the second cache activeness signal representative of a determined usage of the second set of cache entries by the second group of computing nodes.

6. The system of claim 5, wherein the processor circuit: determines to
    reclaim the portion of the cache memory by:
        determining a total of the second set of cache entries used by the second group of
    computing nodes has a predetermined relationship with a threshold; and
    reclaims the portion of the cache memory by:
        reclaiming a cache entry of the second set of cache entries.

7. The system of claim 1, wherein the processor circuit generates the first cache activity signal by:
    determining that an external pressure limit is reached based at least on the determined usage of the sampled cache entries and global cache usage data, the global cache usage data representative of usage of the cache memory by the cluster of computing nodes; and
    generating the first cache activeness signal to include an indication that the external pressure limit is reached.

8. The system of claim 1, wherein the first group of computing nodes comprises at least one of:
    a computing node associated with a user;
    a plurality of computing nodes associated with a group of users; or
    a plurality of computing nodes associated with a tenant.

9. A method for reclaiming a portion of a cache memory in a cloud computing environment, the method comprising:

determining a sample size of a first group of computing
nodes in a cluster of computing nodes, the sample size
determined based on a job cap of the first group of
computing nodes, sampling a first set of cache entries of the cache memory
based on the determined sample size, the first set of
cache entries assigned to the first group of computing
nodes;

determining a first cache activeness signal, the first cache
activeness signal representative of a usage of the
sampled cache entries of the cache memory by the first
group of computing nodes;

determining to reclaim a portion of the first set of cache
entries or of a second set of cache entries based at least
on the first cache activeness signal, the second set of
cache entries utilized by a second group of computing
nodes in the cluster of computing nodes; and reclaiming the determined portion of the cache memory.

10. The method of claim 9, wherein said determining to
reclaim the portion of the cache memory comprises:

determining a subset of the sampled cache entries
accessed by the first group of computing nodes within
a first period of time, determining a total of the sampled cache entries used by
the first group of computing nodes, and determining a ratio of the determined subset to the deter-
mined total of the sampled cache entries has a prede-
termined relationship with a threshold; and said reclaiming the determined portion of the cache
memory comprises:

reclaiming a cache entry of the first set of cache entries.

11. The method of claim 9, wherein the first cache
activeness signal comprises an indication that a first limit is
reached; and said determining to reclaim the portion of the cache
memory comprises:

determining to reclaim a subset of the first set of cache
entries based at least on the indication that the first
limit is reached.

12. The method of claim 9, wherein said determining to
reclaim the portion of the cache memory comprises:

determining to reclaim the portion of the cache memory
based at least on the first cache activeness signal and a
second cache activeness signal, the second cache
activeness signal representative of a determined usage
of the second set of cache entries by the second group
of computing nodes.

13. The method of claim 12, wherein said determining to
reclaim the portion of the cache memory comprises:

determining a total of the second set of cache entries used
by the second group of computing nodes has a prede-
termined relationship with a threshold; and said reclaiming the portion of the cache memory com-
prises:

reclaiming a cache entry of the second set of cache
entries.

14. The method of claim 9, said determining to reclaim
the portion of the cache memory comprises:

obtaining global cache usage data representative of usage
of the cache memory by the cluster of computing
nodes;

determining that an external pressure limit is reached
based at least on the first cache activeness signal and
the obtained global cache usage data; and determining to reclaim the portion of the cache memory.

15. A resource monitoring system coupled to a cluster of
computing nodes in a cloud computing environment, the
resource monitoring system comprising:

a processor circuit; and a memory that stores program code executable by the
processor circuit to perform operations for reclaiming a
portion of a cache memory in the cloud computing
environment, the operations comprising:

determining a sample size of a first group of computing
nodes in a cluster of computing nodes, the sample
size determined based on a number of active users
associated with the first group of computing nodes, sampling a first set of cache entries of the cache
memory based on the determined sample size, the
first set of cache entries assigned to the first group of
computing nodes;

determining a first cache activeness signal, the first
cache activeness signal representative of a usage of
the sampled cache entries of the cache memory by
the first group of computing nodes;

determining to reclaim a portion of the first set of cache
entries or of a second set of cache entries based at
least on the first cache activeness signal, the second
set of cache entries utilized by a second group of
computing nodes in the cluster of computing nodes;
and reclaiming the determined portion of the cache
memory.

16. The resource monitoring system of claim 15, wherein
said determining to reclaim the portion of the cache memory
comprises:

determining a subset of the sampled cache entries
accessed by the first group of computing nodes within
a first period of time, determining a total of the sampled cache entries used by
the first group of computing nodes, and determining a ratio of the determined subset to the deter-
mined total of the sampled cache entries has a prede-
termined relationship with a threshold; and said reclaiming the determined portion of the cache
memory comprises:

reclaiming a cache entry of the first set of cache entries.

17. The resource monitoring system of claim 15, wherein
the first cache activeness signal comprises an indication that
a first limit is reached; and said determining to reclaim the portion of the cache
memory comprises:

determining to reclaim a subset of the first set of cache
entries based at least on the indication that the first
limit is reached.

18. The resource monitoring system of claim 15, wherein
said determining to reclaim the portion of the cache memory
comprises:

determining to reclaim the portion of the cache memory
based at least on the first cache activeness signal and a
second cache activeness signal, the second cache
activeness signal representative of a determined usage
of the second set of cache entries by the second group
of computing nodes.

19. The resource monitoring system of claim 18, wherein
said determining to reclaim the portion of the cache memory
comprises:

determining a total of the second set of cache entries used
by the second group of computing nodes has a prede-
termined relationship with a threshold; and said reclaiming the portion of the cache memory com-
prises:

reclaiming a cache entry of the second set of cache entries.

20. The resource monitoring system of claim 15, wherein said determining to reclaim the portion of the cache memory comprises:

obtaining global cache usage data representative of usage of the cache memory by the cluster of computing nodes;

determining that an external pressure limit is reached based at least on the first cache activeness signal and the obtained global cache usage data; and determining to reclaim the portion of the cache memory.

\* \* \* \* \*